US012462650B2

(12) United States Patent
Hsu et al.

(10) Patent No.: US 12,462,650 B2
(45) Date of Patent: Nov. 4, 2025

(54) GAME SYSTEM AND OPERATION METHOD THEREOF

(71) Applicant: Tien-Shu Hsu, Taichung (TW)

(72) Inventors: Shun-Tsung Hsu, Taichung (TW); Chang-Yi Wang, Taichung (TW); Lien-Yung Lin, Taichung (TW)

(73) Assignee: Tien-Shu Hsu, Taichung (TW)

( * ) Notice: Subject to any disclaimer, the term of this patent is extended or adjusted under 35 U.S.C. 154(b) by 469 days.

(21) Appl. No.: 17/914,607

(22) PCT Filed: Apr. 3, 2020

(86) PCT No.: PCT/CN2020/083294
§ 371 (c)(1),
(2) Date: Sep. 26, 2022

(87) PCT Pub. No.: WO2021/196196
PCT Pub. Date: Oct. 7, 2021

(65) Prior Publication Data
US 2023/0122005 A1 Apr. 20, 2023

(51) Int. Cl.
*G07F 17/32* (2006.01)

(52) U.S. Cl.
CPC ...... *G07F 17/3267* (2013.01); *G07F 17/3213* (2013.01)

(58) Field of Classification Search
CPC ... G07F 17/3267; G07F 17/3213; G07F 17/34
See application file for complete search history.

(56) References Cited

U.S. PATENT DOCUMENTS

| | | | | |
|---|---|---|---|---|
| 5,752,881 | A * | 5/1998 | Inoue | G07F 17/3213 463/20 |
| 2004/0204228 | A1* | 10/2004 | Walker | G07F 17/3244 463/20 |
| 2005/0043083 | A1* | 2/2005 | Inoue | G07F 17/32 463/20 |
| 2005/0288090 | A1* | 12/2005 | Thomas | G07F 17/3286 463/20 |
| 2008/0051181 | A1 | 2/2008 | Okada | |
| 2009/0239646 | A1* | 9/2009 | Yoshizawa | G07F 17/32 463/31 |
| 2020/0013259 | A1* | 1/2020 | Oyama | G07F 17/3267 |

FOREIGN PATENT DOCUMENTS

| | | | |
|---|---|---|---|
| CN | 101118667 | A | 2/2008 |
| CN | 101140674 | A | 3/2008 |
| CN | 102810232 | A | 12/2012 |

* cited by examiner

*Primary Examiner* — James S. McClellan
(74) *Attorney, Agent, or Firm* — MUNCY, GEISSLER, OLDS & LOWE, P.C.

(57) ABSTRACT

When a control unit in a game system of the present invention stops rollers of a next free game from rolling during performing a plurality of consecutive free games, a special symbol appearing in a free game currently performed overlaps a game symbol appearing in the free game performed next. Accordingly, players can not only feel the fun of accumulating the special symbols and look forward to collecting more of the special symbols, but also make a probability of the special symbols appearing in a game screen of each of the free games to be kept constant, thereby simplifying the difficulty in calculating a return to player (RTP).

18 Claims, 15 Drawing Sheets

GAME SYSTEM AND OPERATION METHOD THEREOF

FIELD OF THE INVENTION

The present invention relates to an amusement electronic device, and more particularly to a game system and an operation method thereof for performing a roller game.

BACKGROUND OF THE INVENTION

Game system provides a game, and game system can be installed in a game machine of a game center, or connected with an electronic device in a private home space for players to use the game machine or electronic device to play games. The management cost is low, and can be applied to a variety of games such as slot machine, poker game, SicBo (dices) and roulette, etc., and therefore game system is widely popular among players and operators.

Among the games, rollers of the slot machine are in a manner of rolling and then stopping, and the criteria provided by the game's payout table (or called pay table) allowing the player to get one or a plurality of win combinations composed of a variety of game symbols displayed on the rollers, and obtain rewards corresponding to the various game symbols or win combinations, such as high scores, reward games, etc.

In reward games, the player can get a certain quantity of free games. The free games are played consecutively, for example, to proceed one round after another automatically, or the player presses the start button on the slot machine each time, a next round will be played. In each round of free games, rollers are in a manner of rolling and then stopping, and the criteria provided by the game's payout table allowing the player to get one or a plurality of win combinations composed by a variety of game symbols displayed on the rollers, and obtain the corresponding rewards. When the player has a chance to get a reward game, there is a chance to get a higher score (or called payout value) in free games.

However, after entering the reward game, the operation method of performing the free game is usually unchangeable, and thus the player gets bored easily, and there is no expectation and surprise, so it is difficult to improve the amusement.

SUMMARY OF THE INVENTION

A main object of the present invention is to disclose a game system and an operation method thereof capable of making players to have expectation after entering a reward game, thereby greatly improving amusement.

In order to achieve the above object, the present invention discloses at least the following embodiments.

The present invention provides a game system. In one embodiment, the game system includes a game result generating unit, a display unit, and a control unit. The control unit is connected to the game result generating unit and the display unit. The control unit executes a plurality of commands of a roller game to control operation of the game system. A first game result is generated through the game result generating unit, and a first game screen is generated by corresponding to the first game result. The first game screen includes a plurality of first rollers which are arranged adjacent to each other and a plurality of first game symbols. The plurality of first rollers are in a manner of rolling and stopping to allow the plurality of first game symbols displaying on the first rollers, respectively. The display unit displays the first game screen. When the control unit determines that a start-up event associated with the first game screen occurs, a reward game is started, and at least two consecutive free games are provided by the reward game.

In each of the free games, the control unit controls operation of the game system, so that the game result generating unit generates a second game result and a second game screen by corresponding to the second game result, and the display unit displays the second game screen. The second game screen includes a plurality of second rollers which are arranged adjacent to each other and a plurality of second game symbols. The second rollers are in a manner of rolling and stopping to allow the second game symbols displaying on the second rollers, respectively. When the second rollers of a next free game stop rolling, a first special symbol appeared in a current free game will be displayed at a position in the next free game where is overlapped the position of the second game symbol in the next free game. Finally, the control unit determines a payout result to pay a player at least based on the first game result and each of the second game results.

And in another embodiment, a quantity of the first special symbol appeared in the second game symbols of the current free game in the foregoing embodiment can be less than or equal to a quantity of the first special symbol appeared in the second game symbols of the next free game.

The present invention further provides another game system. In one embodiment, the game system includes a game result generating unit and a control unit. The control unit is connected to the game result generating unit, and the control unit further communicates with an electronic device of a player. The electronic device includes a display screen. The control unit executes a plurality of commands of a roller game to control operation of the game system. A first game result is generated through the game result generating unit, and a first game screen is generated by corresponding to the first game result, and the first game screen is transmitted to the display screen for presentation. The first game screen includes a plurality of first rollers which are arranged adjacent to each other and a plurality of first game symbols. The first rollers are in a manner of rolling and stopping to allow the first game symbols displaying on the first rollers, respectively. When the control unit determines that an start-up event associated with the first game screen occurs, a reward game is started, and the reward game provides at least two consecutive free games.

In each of the free games, the control unit controls operation of the game system. The game result generating unit generates a second game result and generates a second game screen by corresponding to the second game result, and the second game screen is transmitted to the display screen for presentation. The second game screen includes a plurality of second rollers which are arranged adjacent to each other and a plurality of second game symbols. The second rollers are shown in a manner of rolling and stopping to allow the second game symbols displaying on the second rollers, respectively. When the second rollers of a free game performed next stop rolling, a first special symbol appearing in a free game currently performed will display at a position in the free game performed next where is overlapped the position of the second game symbol in the free game performed next. Finally, the control unit determines a payout result to pay a player at least based on the first game result and each of the second game results.

The present invention further provides an operation method of a game system. In one embodiment, the game system is provided for a player to play a roller game. The game system includes a game result generating unit, a display unit, and a control unit. The operation method is as follows: generating a first game result and generating a first game screen by corresponding to the first game result through the game result generating unit; displaying the first game screen through the display unit, the first game screen including a plurality of first rollers which are arranged adjacent to each other and a plurality of first game symbols, displaying the first game symbols on the first rollers respectively by a manner of rolling and stopping the plurality of first rollers; and when the control unit determining that an start-up event associated with the first game screen occurring, starting a reward game, and the reward game providing at least two consecutive free games.

In each of the free games, the control unit controlling operation of the game system by the following steps: generating a second game result and generating a second game screen by corresponding to the second game result through the game result generating unit; displaying the second game screen through the display unit, the second game screen including a plurality of second rollers which are arranged adjacent to each other and a plurality of second game symbols; displaying the second game symbols on the second rollers respectively by a manner of rolling and stopping the plurality of second rollers, when the second rollers of a free game performed next stopping rolling, a first special symbol appearing in a free game currently performed displaying at a position in the free game performed next where is overlapped the position of the second game symbol in the free game performed next; and finally, the control unit determining a payout result to pay a player at least based on the first game result and each of the second game results.

The present invention provides another game system. In one embodiment, the game system includes a game result generating unit, a display unit, and a control unit. The control unit is connected to the game result generating unit and the display unit. The control unit executes a plurality of commands of a roller game to control operation of the game system. a first game result is generated through the game result generating unit, and a first game screen is generated by corresponding to the first game result, and the display unit displays the first game screen. The first game screen includes a plurality of main rollers which are arranged adjacent to each other and a plurality of first game symbols, and the first game symbols are displayed on the main rollers, respectively. The game result generating unit generates a second game result, and generates a second game screen by corresponding to the second game result, and the display unit displays the second game screen. The second game screen includes the main rollers and a plurality of second game symbols, and the second game symbols are displayed on the main rollers, respectively. When at least one of the first game symbols in the first game screen is a special symbol, the second game screen further includes at least one secondary roller. The at least one secondary roller overlaps the main roller where the special symbol is located, so that when the main rollers and the at least one secondary roller of the second game screen stop rolling, the special symbol at a position overlaps the second game symbol at the position in the second game screen. The special symbol is located on one of the main roller overlapped and the secondary roller; and the second game symbol overlapping the special symbol is located on the other one of the main roller overlapped and the secondary roller. Finally, the control unit determines a payout result to pay a player at least based on at least one of the first game result and the second game result.

The present invention provides another game system. In one embodiment, the game system includes a display unit and a controller. The controller is connected to the display unit, and executes a plurality of commands of a roller game to control the game system to perform the following steps: the controller generating a first game screen, the first game screen including a plurality of rollers adjacently arranged, displaying a first set of game symbols on the rollers by a manner of rolling and stopping, and the first set of game symbols including a plurality of special symbols; the controller generating a second game screen, the second game screen including the rollers, displaying a second set of game symbols and the special symbols on the rollers by a manner of rolling and stopping, and at least part of the second set of game symbols overlapping the special symbols when the rollers stopping rolling; the display unit displaying the second game screen and the first game screen; and the controller determining a payout result to pay a player at least based on the special symbols.

Accordingly, the present invention discloses the game system and the operation method thereof capable of causing the position where the special symbol appears in the previous round of free games to still show the special symbol in the next round of free games again. Therefore, players can not only feel the fun of accumulating the special symbols, but also look forward to collecting more of the special symbols. Further, in each round of the free games, compared to the conventional technical feature of keeping part of the rollers stationary, the first rollers of the present invention can be rotated without being kept stationary, so a appearing probability of the special symbols in the game screen of each of the free games can be kept constant, thereby simplifying the difficulty of calculating a return to player (RTP). In addition, adopting the design of the main rollers and the secondary rollers can make the game content more variable, and enhance the flexibility of design in terms of visual effects to further improve the amusement of the game.

DETAILED DESCRIPTION OF THE PREFERRED EMBODIMENTS

The detailed description of the present invention is described below with reference to the drawings.

Figure 1:
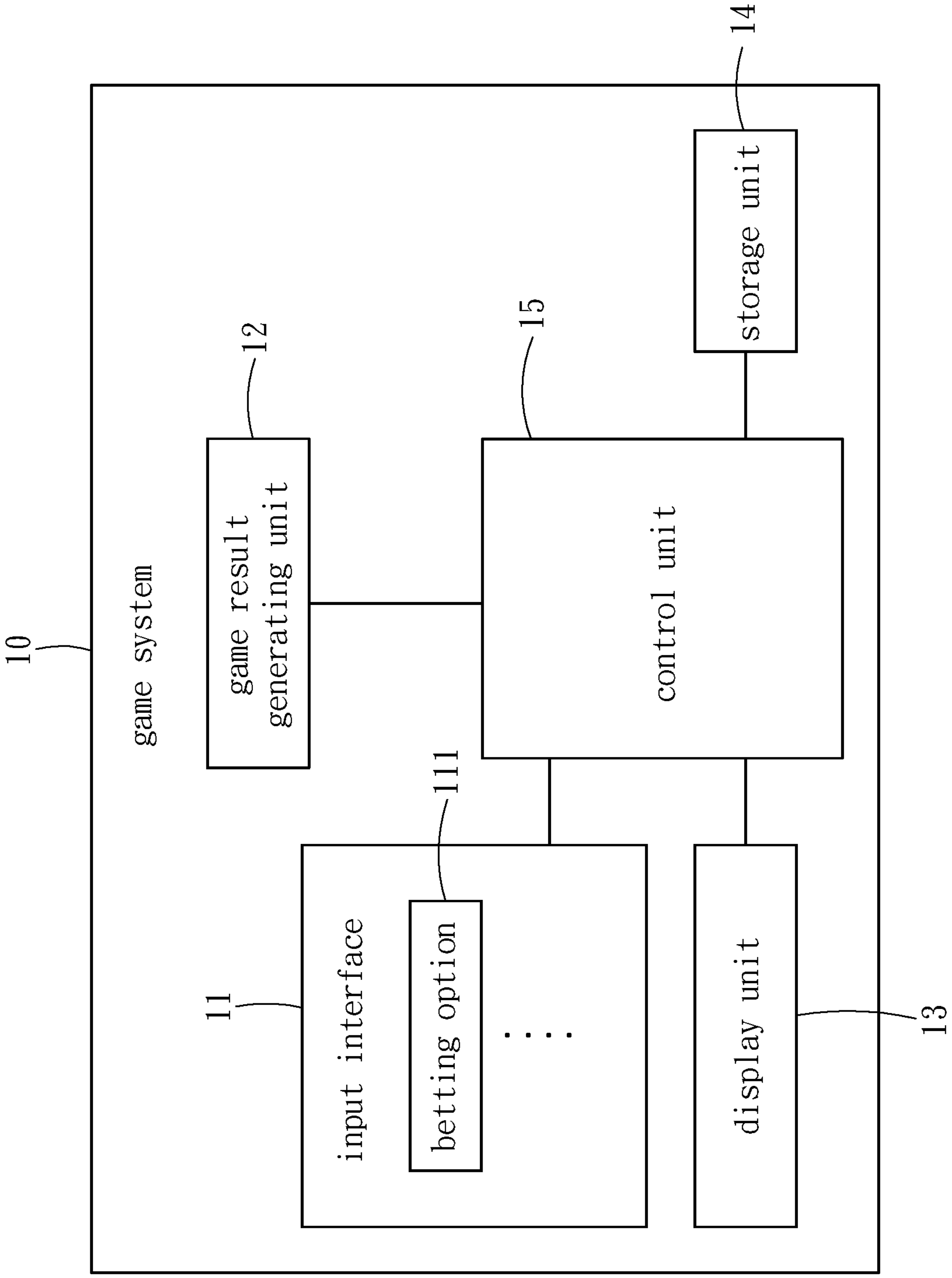
FIG. 1 is a functional block diagram of a game system of the present invention.
Figure 2:
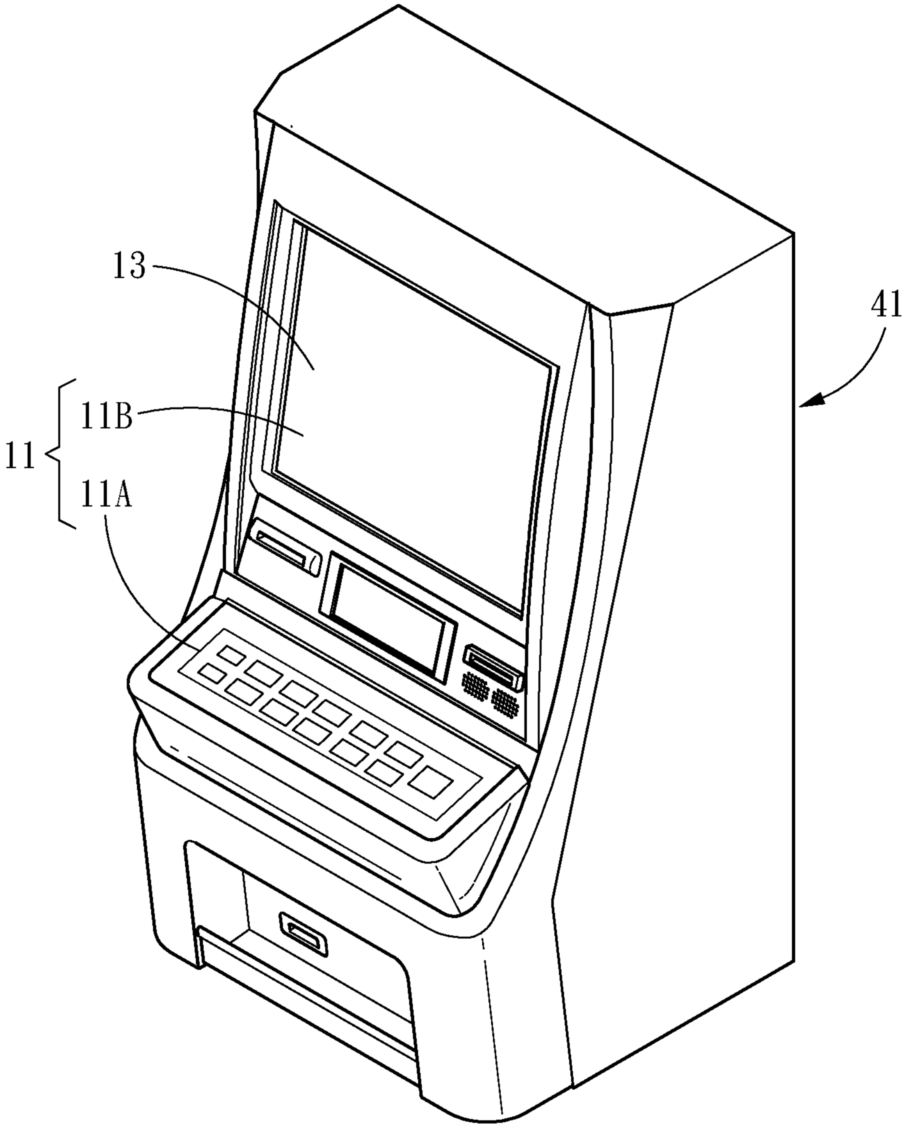
FIG. 2 is a perspective view of a game machine of the present invention.

Please refer to FIG. 1, which is a functional block diagram of a game system according to one embodiment of the present invention. In this embodiment, a game system 10 is disclosed. The game system 10 can be, for example but not limited to, independently installed in a game machine 41, as shown in FIG. 2. The game system 10 includes an input interface 11, a game result generating unit 12, a display unit 13, a storage unit 14, and a control unit 15. The control unit 15 is connected to the input interface 11, the game result generating unit 12, the display unit 13 and the storage unit 14.

In this embodiment or other embodiments, the game result generating unit 12 and the control unit 15 can be implemented by one or more controllers, processors, or control circuits.

The storage unit 14 can store data and program commands required for operation of the game system 10, and the storage unit 14 can also store application programs of a roller game, so that the control unit 15 can execute commands of the application programs to create one or more databases. The one or more databases can include, for example, a program library of one or more sets of game schedules and instruction sets used to implement the roller game. The one or more databases can also, for example, include an image library, wherein the image library can include, for example, a variety of patterns such as game symbols, special symbols, roller patterns, background patterns and other static or dynamic images, etc. Through changes in combination of patterns and/or motion pictures, the one or more databases not only can provide materials of a game screen of the roller game, but also can achieve the object of visually improving the amusement effect; however, the present invention is not limited thereto.

Figure 3:
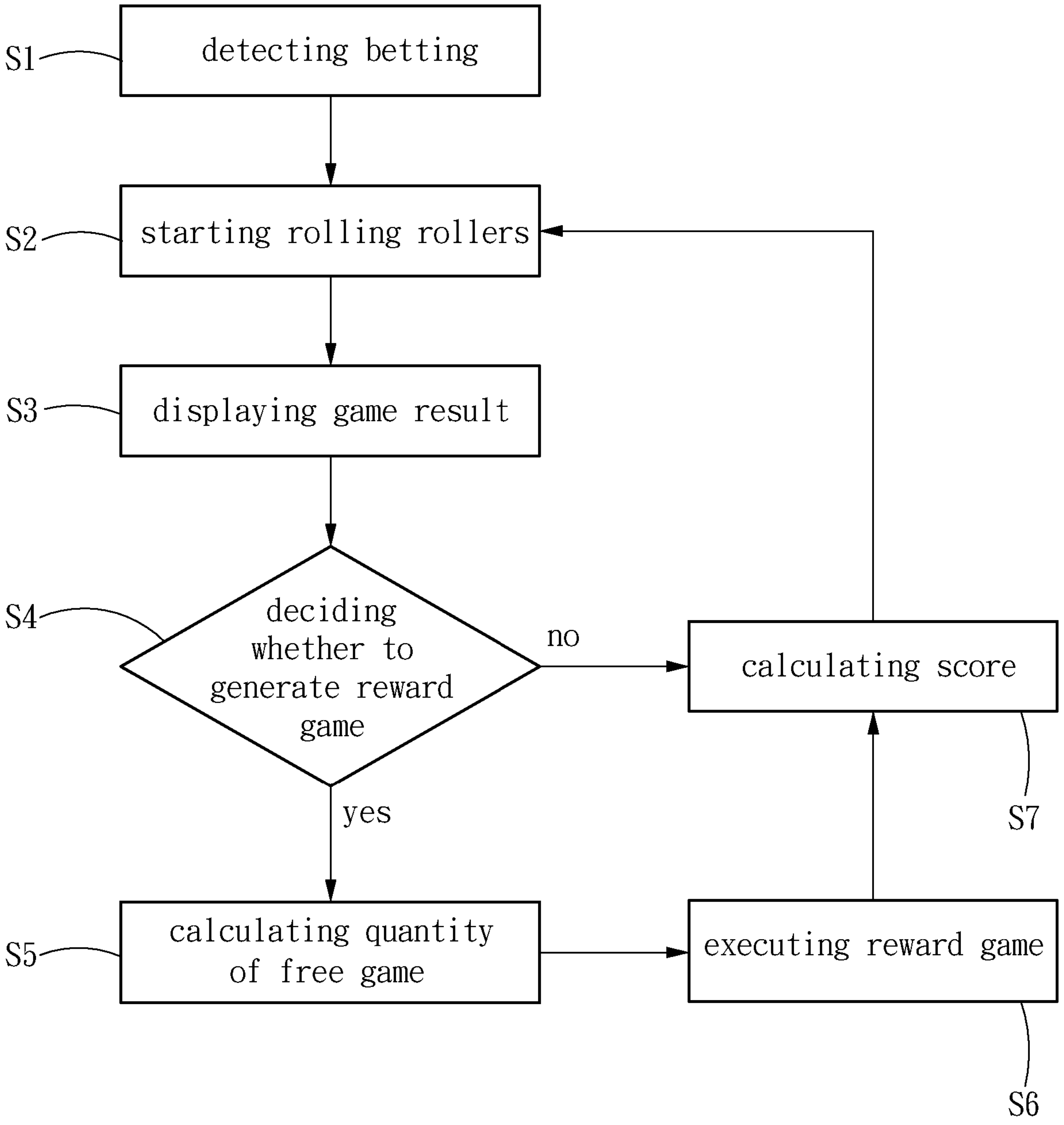
FIG. 3 is an operation flow chart of generating a reward game of the present invention.

Therefore, the control unit 15 can control the game system 10 to execute the roller game through the commands of the application programs of the roller game. At least part of operation procedures of the roller game can be referred to FIG. 3, and illustrations are provided hereinafter.

First, in step S1: with the game system 10 being turned on, through the input interface 11, the control unit 15 detects whether any physical objects inputting into the input interface 11 or attempting to approach or touch the input interface 11, or detects or receives data input through the input interface 11, or any combinations of the above. Specifically, in this embodiment or other embodiments, the input interface 11 can include, for example, ticket machine, coin machine, card reader, scan recognizer, sensor recognizer, communication interface capable of connecting to internal network or external network, or other devices with functions of data input, identification, counting, data storage, or any combinations thereof. Take the input interface 11 including a card reader as an example, when a player inserts a stored value card into the card reader, the card reader identifies data of the stored value card (such as stored value points, etc.) and transmits the data to the control unit 15, the control unit 15 stores the data in a register and sets the stored value points as a bet value balance, and then displays the bet value balance on the display unit 13. In this embodiment or other embodiments, the input interface 11 can further include a configuration that can be selected or operated by the player, such as one or more option buttons, roller start buttons, other function buttons, or any combinations of the above. As shown in FIG. 2, a button can be a physical button 11A or implemented by a touch panel combined with the display unit 13 or another display unit to form a touch display 11B. Taking the touch display 11B to implement a button as an example, the control unit 15 controls the touch display 11B to provide one or more betting options 111 before or after displaying the bet value balance according to commands, so that the player can bet by selecting from the one or more betting options 111 provided by the input interface 11, and at the same time the control unit 15 detects a betting signal generated by the input interface 11 according to the player's selection. Taking the touch display 11B to implement a start button as an example, when the player pressing a start button displayed on the touch display 11B, step S2 is performed: the touch display 11B generating a game start signal correspondingly to enable the control unit 15 to know that the player wanting to start rolling rollers by detecting occurrence of the game start signal.

Therefore, when the control unit 15 learns a bet value selected by the player and receives the game start signal, step S3 is performed: the control unit 15 controlling the game result generating unit 12 to generate a game result (first game result) and generate a game screen corresponding to the game result according to commands, and then the display unit 13 displaying the game screen.

In this embodiment or other embodiments, the game screen can include a plurality of rollers which are arranged adjacent to each other, at least one pattern display position is provided on each of the rollers to display at least one game symbol. When the player presses the start button, the rollers start to roll visually, and stop after a period of time; at this time, the game symbol is displayed at the pattern display position of the rollers. Arrangement form and quantity of the rollers, and configuration and quantity of the pattern display position on each of the rollers can be designed according to requirements of the game. For example, each of the rollers has M pattern display positions, and there are a total of N rollers, so all the rollers can form an M×N matrix and provide M×N pattern display positions, such as 3×5 pattern display positions. In another example, there is only one pattern display position on each of the rollers, so if M×N pattern display positions are to be provided, the game screen will have M×N rollers. In another example, at least two of the adjacent rollers are vertically staggered or offset from each other, or at least two of the adjacent rollers overlap each other from front and rear.

On the other hand, the game result is randomly generated, for example, using a random number generator to generate a random number relevant to the patterns and the pattern display positions, a random number relevant to a roller belt stop position, or a random number relevant to a roller belt section. Wherein the so-called roller belt stop position refers to a certain position on the roller belt of the roller will be set as a reference point for stopping rotation of the roller; and the so-called roller belt section refers to a certain section of the roller belt will be displayed to the player. In the example where the random number is relevant to the patterns and the pattern display positions, the game result generating unit 12 can, for example, select the corresponding patterns from the database according to the random number, and then display the patterns at the pattern display positions of the rollers respectively. In the example where the random number is relevant to the roller belt stop position, the patterns are pre-set on the roller belt, and the game result generating unit

12 can, for example, specify one of the positions on the roller belt according to the random number, and further select other positions from the predetermined position according to a size of the roller to be displayed (i.e. a quantity of the pattern display positions on one of the rollers of the game screen), so that a last selected quantity of the positions matches the size of the roller. In the example where the random number is relevant to the roller belt section, the patterns are pre-set on the roller belt, and the game result generating unit 12 can, for example, directly select the continuous positions for displaying the patterns on the roller belt according to the random number. However, the present invention is not limited to the examples listed above. The random number generator can be built in the game result generating unit 12, or can be built in the control unit 15, or can even be independent of the game result generating unit 12 and the control unit 15.

In practice, in one embodiment, the game result generating unit 12 can include an image processing unit, the image processing unit can obtain, for example, but not limited to, the data for composing the game screen from the storage unit 14 according to a random number generated by the random number generator, and after the data is processed, the game symbols corresponding to the random number are displayed on the rollers in the screen.

For convenience of explanation, hereinafter five rollers 122 (first roller) of a game screen 121 (first game screen) in FIGS. 4A and 4B being used to provide fifteen of a plurality of pattern display positions to display a plurality of game symbols 123 (first game symbol) are used as an illustrative example.

After generating the game result, the control unit 15 determines whether an start-up event to be occurred in association with the game screen 121 to decide whether to start a reward game or not, that being, step S4. In detail, the game symbols 123 provided by the roller game can include a variety of general symbols, such as pineapples, bananas, strawberries, etc., which are different score multipliers but without special functions in FIG. 4B; and at least one type of special symbol, such as star, magic hat symbols, etc. in FIG. 4B, or percentage symbol or multiple symbol in FIG. 10, or such as game gift symbol, or other game symbols with special functions and capable of potentially improving a payout result. The star symbol can be, for example, a scatter symbol that gives the player a chance to get a reward game or (and) bonus. The magic hat symbol can be, for example, a wild symbol that can be used as any type of general symbol. The percentage symbol can, for example, give the player a chance to multiply a score with a percentage numerical value shown on the percentage symbol. The multiple symbol can, for example, give the player a chance to multiply a score with a numerical value shown on the multiple symbol, or multiply or add a quantity of the game symbols that have a chance to form a win combination with a numerical value shown on the multiple symbol. The game gift symbol can be, for example, a symbol that provides the player with a given quantity of rounds of free games. The special symbol can also include, for example, but not limited to, a common part and a variable part. The variable part can be changed, for example, but not limited to, according to the player's bet amount, or according to a game event that occurs during the game, or can be selected randomly or by designation from a group of variable parts. For example, the common part of the special symbol can be a star-shaped pattern, and the variable part of the special symbol can be a number that changes according to the player's bet amount, so that when the special symbol is displayed on the roller, the star-shaped pattern with a number can be seen visually. Therefore, the pre-definable start-up event in the roller game is, for example, but not limited to, a quantity of the special symbol of a designated type (hereinafter referred to as designated special symbol) appearing in the game screen 121 meets a threshold value. As shown in FIG. 4B, three of a plurality of designated special symbols 124 (i.e. a plurality of star symbols) appear in the game screen 121.

Figure 4A:
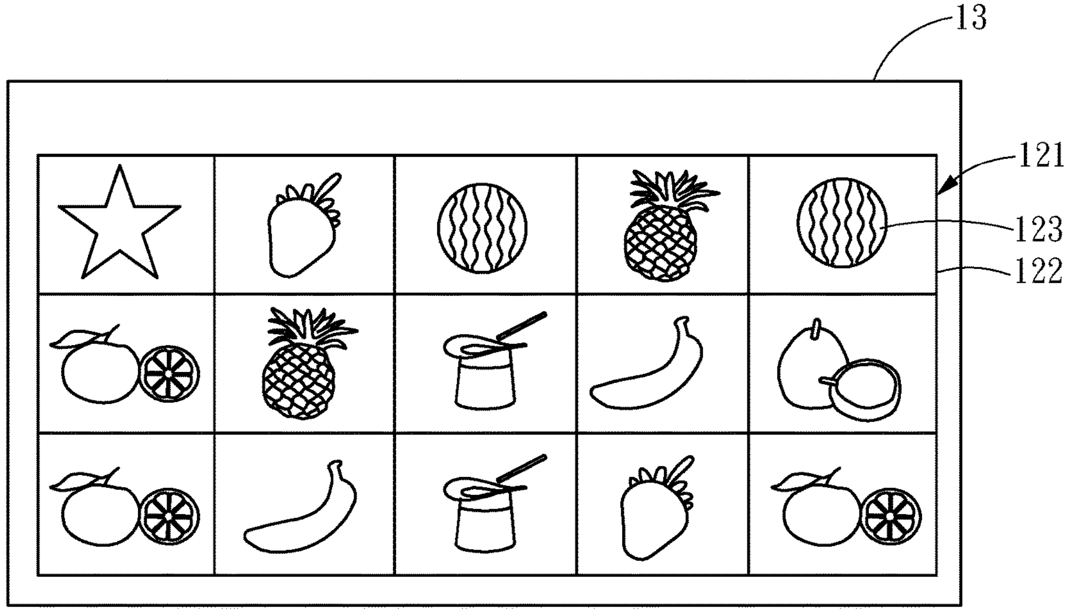
FIGS. 4A-4B are schematic diagrams of a first game screen of the present invention.

In step S4, when no start-up event occurs in the game screen 121, as shown in FIG. 4A, the control unit 15 performs step S7: directly calculating a score based on the current game result, thus completing the round of games. At this time, the player can choose to perform step S2 again, that being, pressing the start button again to start rolling the rollers to start another round of games.

Figure 4B:
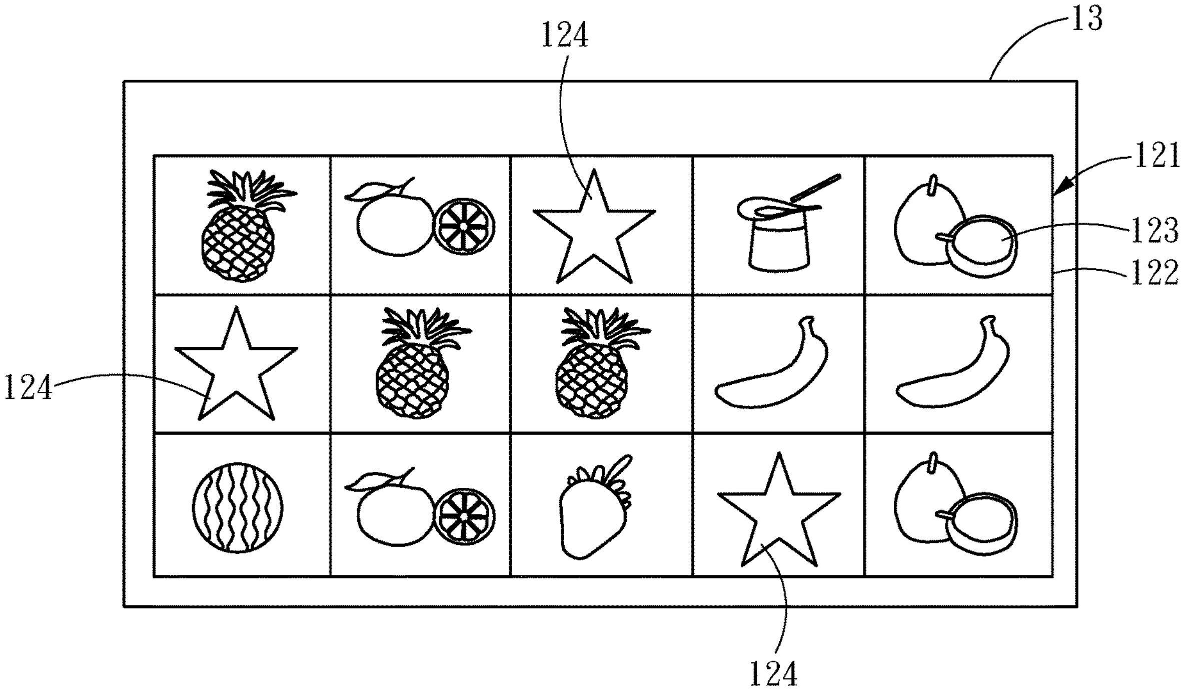

Contrarily, in step S4, if the start-up event occurs in the game screen 121, for example, three of the designated special symbols 124 appear in the game screen 121 as shown in FIG. 4B, the control unit 15 performs step S5: calculating (or defining) an initial quantity (rounds) of free games to be given to the player by the reward game, so that the player can start rolling the rollers again to generate a new game result without having to bet again, the initial quantity can be, for example, but not limited to, greater than or equal to 1. In this embodiment, the initial quantity is independent of a quantity of the star symbol that appears in the game screen 121. For example, as long as a quantity of the star symbol appearing in the game screen 121 meets conditions for occurrence of the start-up event, the reward game provides three rounds of free games, or randomly provides three, five or eight rounds of free games, or provides three, five and eight rounds of free games with options of different levels of game conditions for the player to select. In other embodiments, the initial quantity is associated with a quantity of the star symbol appearing in the game screen 121. For example, as more star symbols appear, the initial quantity of free games will also increase.

The control unit 15 performs step S6: executing the reward game. Regarding execution of the reward game, the following will list a few examples to illustrate the relevant details.

In one embodiment, when the player obtains the reward game, the control unit 15 controls the display unit 13 to display an initial screen. The initial screen can include the rollers, and each of the rollers can provide one or more pattern display positions to display one or more game symbols. A quantity of the rollers in the initial screen, a quantity of the pattern display positions provided by each of the rollers, and types or patterns of the game symbols displayed can be referred to the above-mentioned relevant descriptions and designed in accordance with game requirements. Specifically, the initial screen can be, for example, an adjusted screen of or an unadjusted game screen when the start-up event occurs, such as the game screen 121 shown in FIG. 4B. Alternatively, the initial screen can be, for example, both quantity and type of the game symbol matching with the start-up event to be displayed at a screen of the predetermined pattern display position randomly or presupposingly, for example, the three star symbols matching with the start-up event are stacked and overlapped at a bottom of a roller where the three star symbols are located. Alternatively, the initial screen can be, for example, a default screen unrelated to the start-up event. For convenience of explanation, the game screen 121 shown in FIG. 4B being used as the initial screen is taken as an illustration below.

In this embodiment or other embodiments, the game screen 121 can include progress information for executing the reward game. In detail, data statistically counted by one or more counters can be used to display, for example, but not limited to, a remaining or an accumulated quantity of free games, a sequence number of round of free games in progress, a quantity of the special symbol collected, an accumulated score or other information of the reward game. For example, two counters can be used to statistically count a sequence number of round of free games in progress and a total quantity of free games respectively, and the two statistical results will be visually displayed in the game screen, such as a free game information 30 indicated on the upper right of a game screen 126 in FIG. 6A. The free game information 30 can be represented by "A of B", wherein A is a sequence number of round of free games in progress, B is a total quantity of free games, and a starting value of B is the initial quantity of free games.

In addition, the game screen 126 can further include the rollers and the game symbols, and quantity and configuration of the rollers are the same as the initial screen, and a manner of configuring the game symbols and types of the game symbols on each of the rollers can be referred to the relevant descriptions of the above-mentioned embodiments. For convenience of explanation, a plurality of rollers 127 (second rollers) arranged 5 in a row adjacently in the game screen 126 in FIGS. 6A to 6B being used to display a plurality of game symbols 128 (second game symbol) which are taken as an illustration below.

Figure 5:
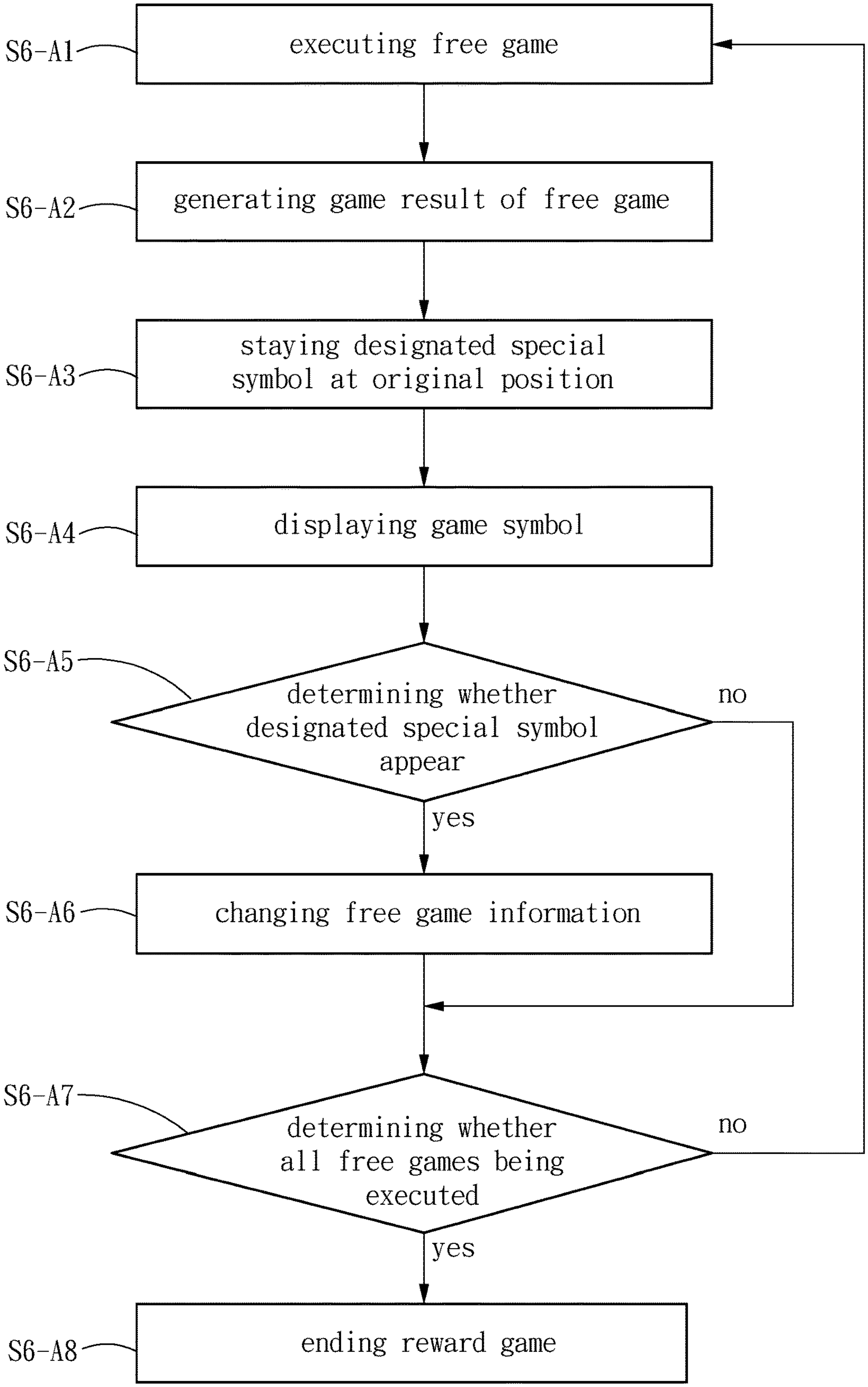
FIG. 5 is an operation flow chart of the reward game of the present invention.

Then, please refer to FIG. 5, when the player presses the start button again or the control unit 15 automatically continues the reward game, step S6-A1 is performed: executing each of the free games in the reward game sequentially. Firstly, in a first round of free games, the control unit 15 controls the game result generating unit 12 to generate a game result of the present round of free games (second game result), that being, performing step S6-A2. Further, the control unit 15 also controls the game result generating unit 12 to generate the game screen 126 (second game screen) corresponding to the game result, and the display unit 13 displays the game screen 126. Method for generating the game screen 126 can be referred to the relevant description in the embodiment of FIG. 3, and presentation and visual effects of the game screen 126 will be listed and explained as follows.

Figure 6A:
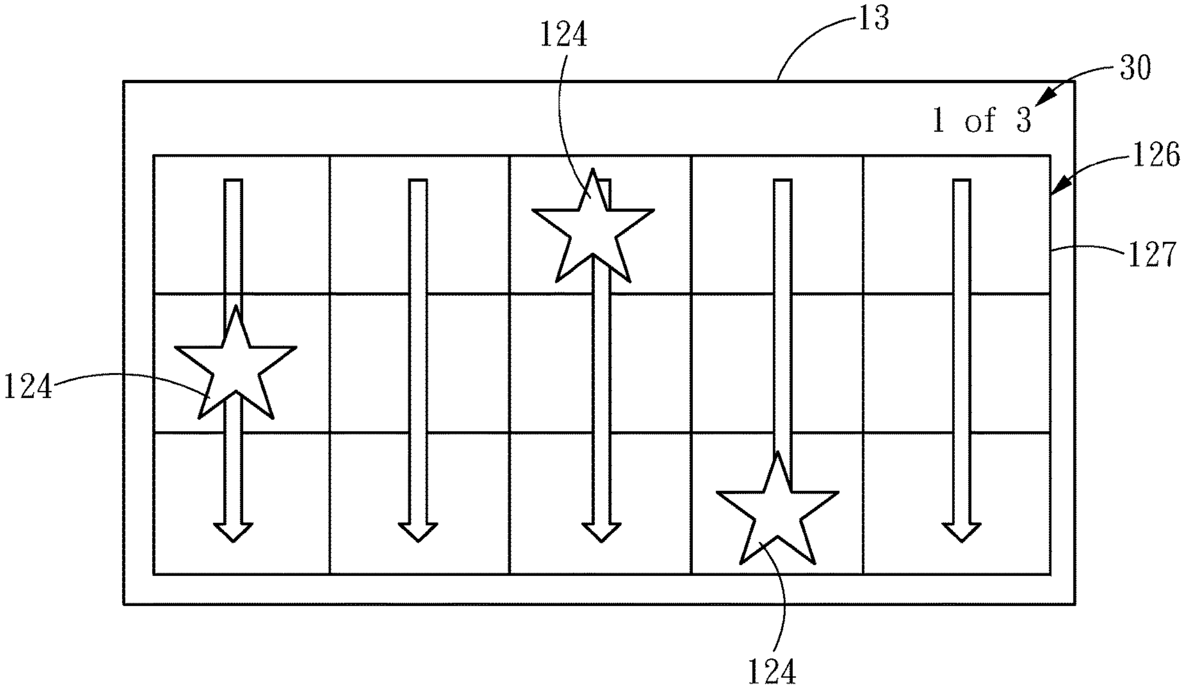
FIGS. 6A-6E are schematic diagrams of a second game screen of the present invention.

Before performing the free games, the control unit 15 can record the initial screen or relevant information (such as position information, quantity information, etc.) of the designated special symbols 124 displaying on the rollers in the game screen that meets the start-up event. Thereby, when each of the rollers 127 in the game screen 126 rolling visually, the designated special symbols 124 correspondingly stay in the game screen 126 that is on the basis of at least part of the recorded relevant information mentioned above at the same time, that being, performing step S6-A3. A quantity of the designated special symbols 124 staying in the game screen 126 is equal to or different from a quantity of the designated special symbols 124 appearing in the start-up event, as shown in FIG. 6A. At this time, the designated special symbols 124 will be visually overlapped with the rollers 127 which are rolling (indicated by arrows). Then, when all the rollers 127 stop rolling, each of the pattern display positions on each of the rollers 127 stopped in the game screen 126 display at least one of the game symbols 128 newly appeared according to the game result generated by the game result generating unit 12, that being, performing step S6-A4, so the game symbols 128 at part of the pattern display positions and the designated special symbols 124 stayed are overlapped, as shown in FIG. 6B.

At this time, the control unit 15 determines whether the designated special symbols 124 additionally appeared in the game screen 126 of the present round according to the game result of the present round, that being, performing step S6-A5. If there are not the designated special symbols 124 additionally appearing in the game symbols 128 newly appeared, it means that the designated special symbols 124 does not additionally appear in the game screen 126. As shown in FIG. 6B, a quantity of the designated special symbols 124 is still equal to a quantity of the designated special symbols 124 in the initial screen or meeting the start-up event, so the player will not be given any additional free game, and a total quantity of free games is unchanged. Contrarily, if the game symbols 128 newly appeared include at least one designated special symbol 124A, it means that the designated special symbol 124A additionally appears in the game screen 126, as shown in FIG. 6C, so the player will be rewarded with at least one additional free game to increase a total quantity of free games. Furthermore, the control unit 15 can update the above recorded related information according to a situation of the designated special symbols 124 displaying on the rollers 127 in the game screen 126 at present.

In this embodiment or other embodiments, in the free games of a same round, a quantity of free games additionally given to the player is related to a quantity of the designated special symbol additionally appearing in the round. For example, each time the designated special symbol additionally appears, the player is given a predetermined quantity of free games. Alternatively, regardless of a quantity of the designated special symbol additionally appearing in the round, a quantity of remaining free games or a quantity of free games that have been played will be reset to an initial value.

Figure 6B:
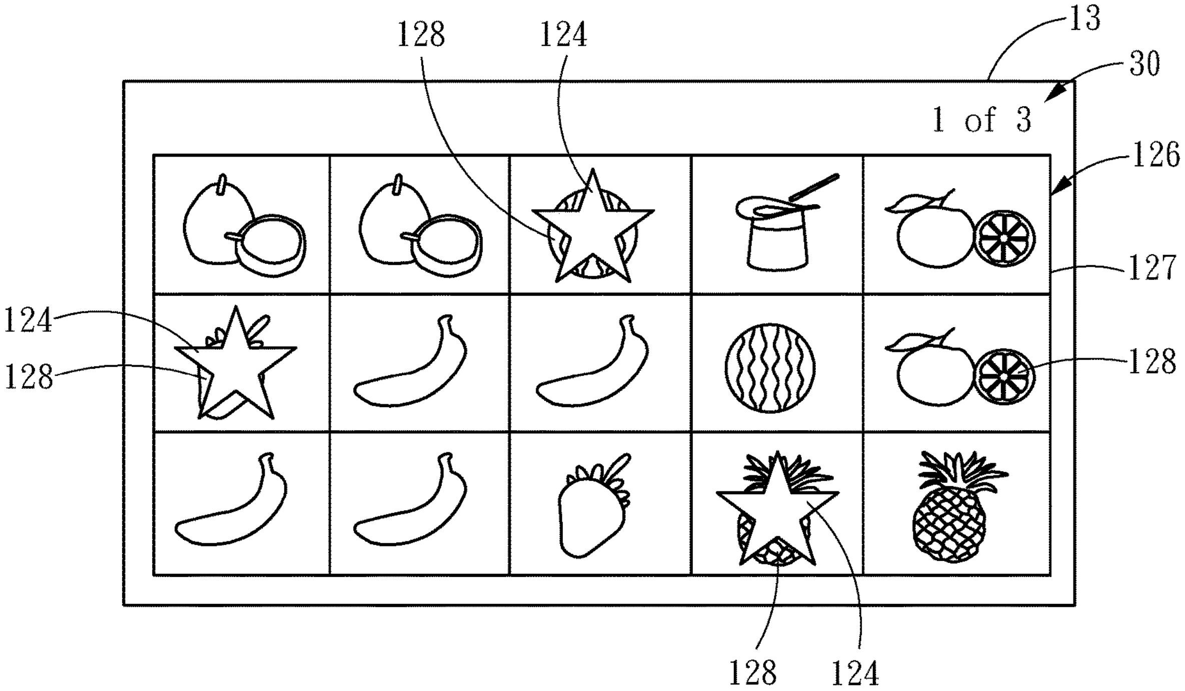
Figure 6C:
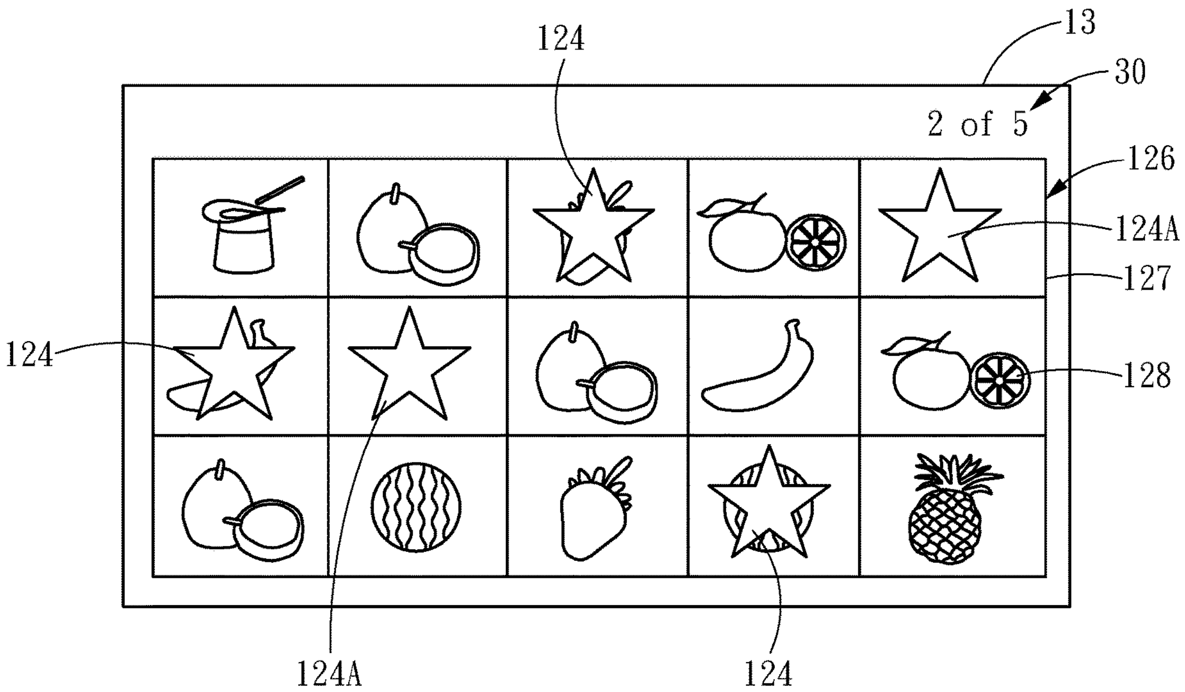

In this embodiment or other embodiments, if the game symbols 128 newly appeared overlapping the designated special symbols 124 stayed is not the designated special symbols 124, the game symbols 128 newly appeared and the designated special symbols 124 stayed will remain visually until starting next round of free games, as shown in FIG. 6B; alternatively, after the game symbols 128 newly appeared and the designated special symbols 124 stayed remain visually for only a short period of time, the game symbols 128 newly appeared immediately disappear; alternatively, the game symbols 128 newly appeared are directly covered or replaced visually by the designated special symbols 124 stayed when the rollers 127 stop rolling.

Figure 6D:
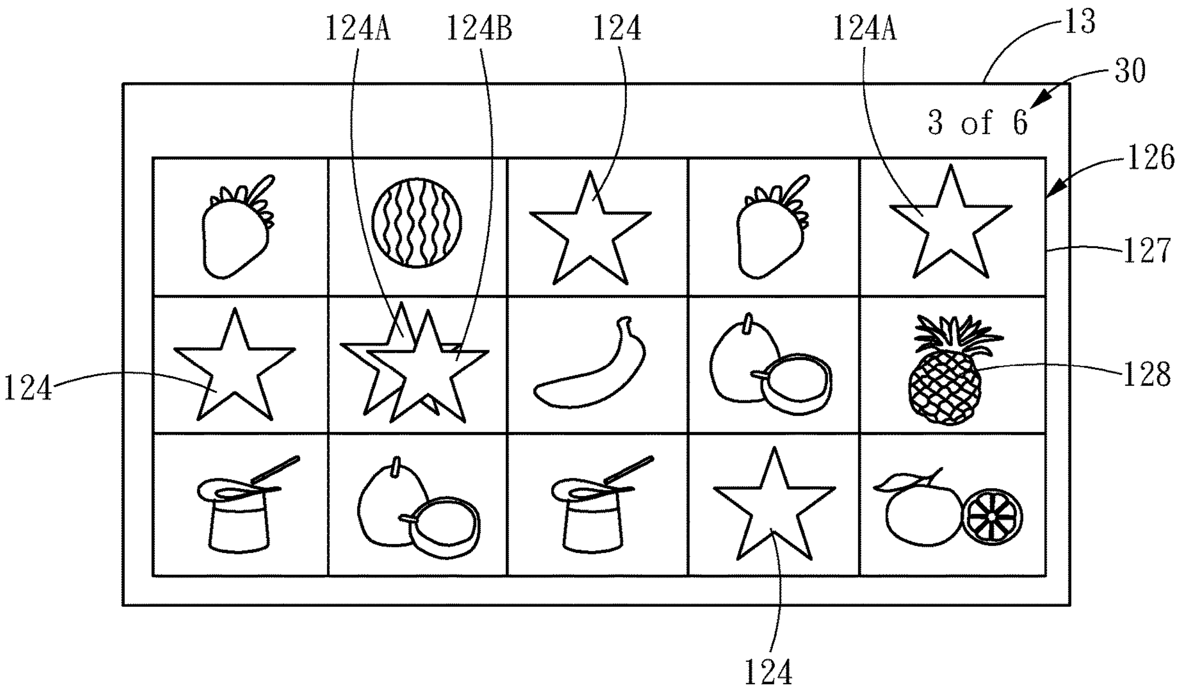
Figure 6E:
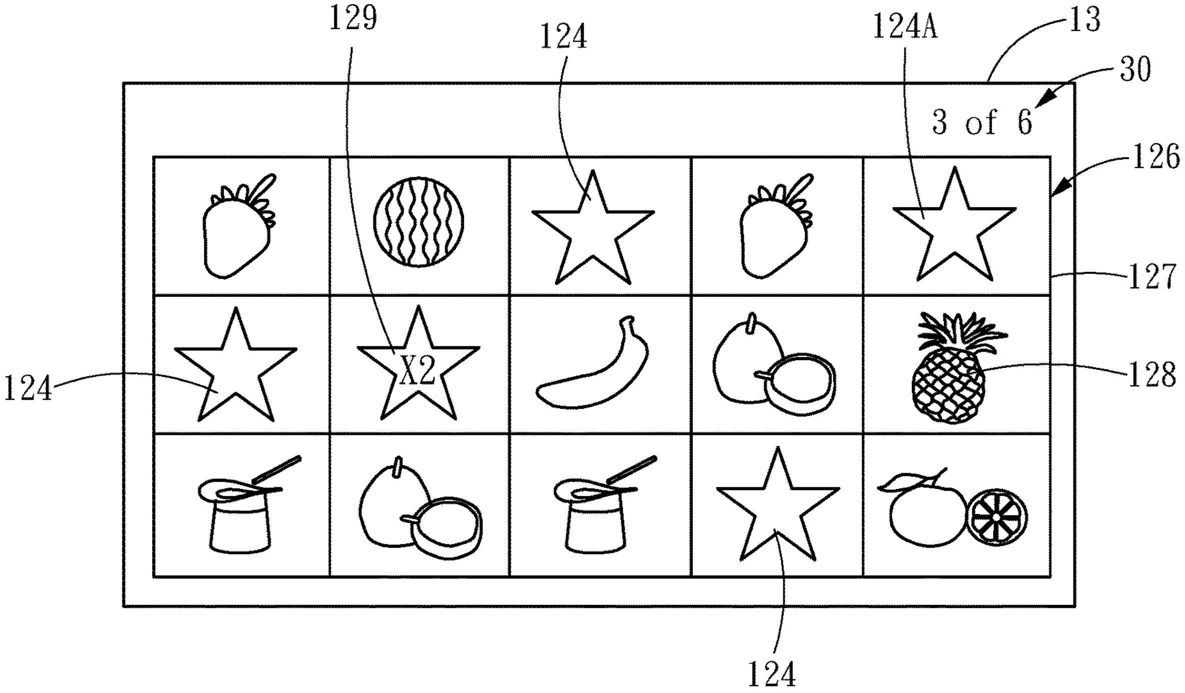

In this embodiment or other embodiments, as shown in FIG. 6D, if the game symbols 128 newly appeared overlapping the designated special symbol 124 stayed is also a designated special symbol 124B, two of the designated special symbols 124A, 124B will remain visually until starting a next round of free games. Alternatively, two of the designated special symbols 124A, 124B will be replaced by an advanced special symbol 129 which quantity is overlapped with the designated special symbols 124 being indicated, as shown in FIG. 6E. Alternatively, the designated special symbols 124A, 124B will be replaced by an upgrade symbol of the designated special symbols 124A, 124B. The upgrade symbol can be designed and created by operators themselves. The upgrade symbol, for example, but not limited to, correspond to higher multipliers or scores.

In this embodiment or other embodiments, the designated special symbols 124 staying in the game screen 126 can be stayed at a position of last appearing in the game screen 126, or stayed at a designated or randomly selected position in the game screen 126.

When step S6-A5 determines that the designated special symbol 124A additionally appears, step S6-A6 is performed: procedure for changing the free game information. For example, as shown in FIG. 6C, since the designated special symbols 124A additionally appear at the pattern display positions of second and fifth columns respectively, the system will change the "B" of the "A of B" of the free game information 30 to increase a total quantity of free games to five.

When step S6-A5 determines that the designated special symbol 124A does not additionally appear, the control unit 15 determines whether all the free games being executed, that being, performing step S6-A7. If there are still free games that have not yet been played, returning to step S6-A1, the control unit 15 continues the next round (second, third . . . round) of free games automatically or after the player pressing the start button again, making the game result generating unit 12 to generate the game result and the game screen 126 corresponding to the game result again according to the updated relevant information mentioned above. Generation method and presentation method of the game screen 126 of the next round (second, third . . . round) of free games can be referred to the generation method and presentation method of the game screen 126 in the first round of free games.

Similarly, the control unit 15 determines whether the game result of the next round (second, third . . . round) of free games indicates additionally appearing of the three designated special symbols 124, that is, determining whether a quantity of the three designated special symbols 124 appearing in the game screen 126 of a second round of free games is greater than a quantity of the three designated special symbols 124 appearing in the game screen 126 of the first round of free games, that is, determines whether the three designated special symbols 124 additionally appear in the game screen 126 of the present round according to the game result of the round. If so, the player is given additional free games to increase a total quantity of free games. If not, no additional free game is given to the player.

As mentioned above, steps S6-A1 to S6-A7 are repeated in each round of free games of the reward game until the free game information 30 indicates "N of N", that is, a total quantity of N free games have been performed. Step S6-A7 determining that all the free games having been executed, and performing step S6-A8: ending the reward game, that being, ending step S6: performing the reward game.

Figure 7:
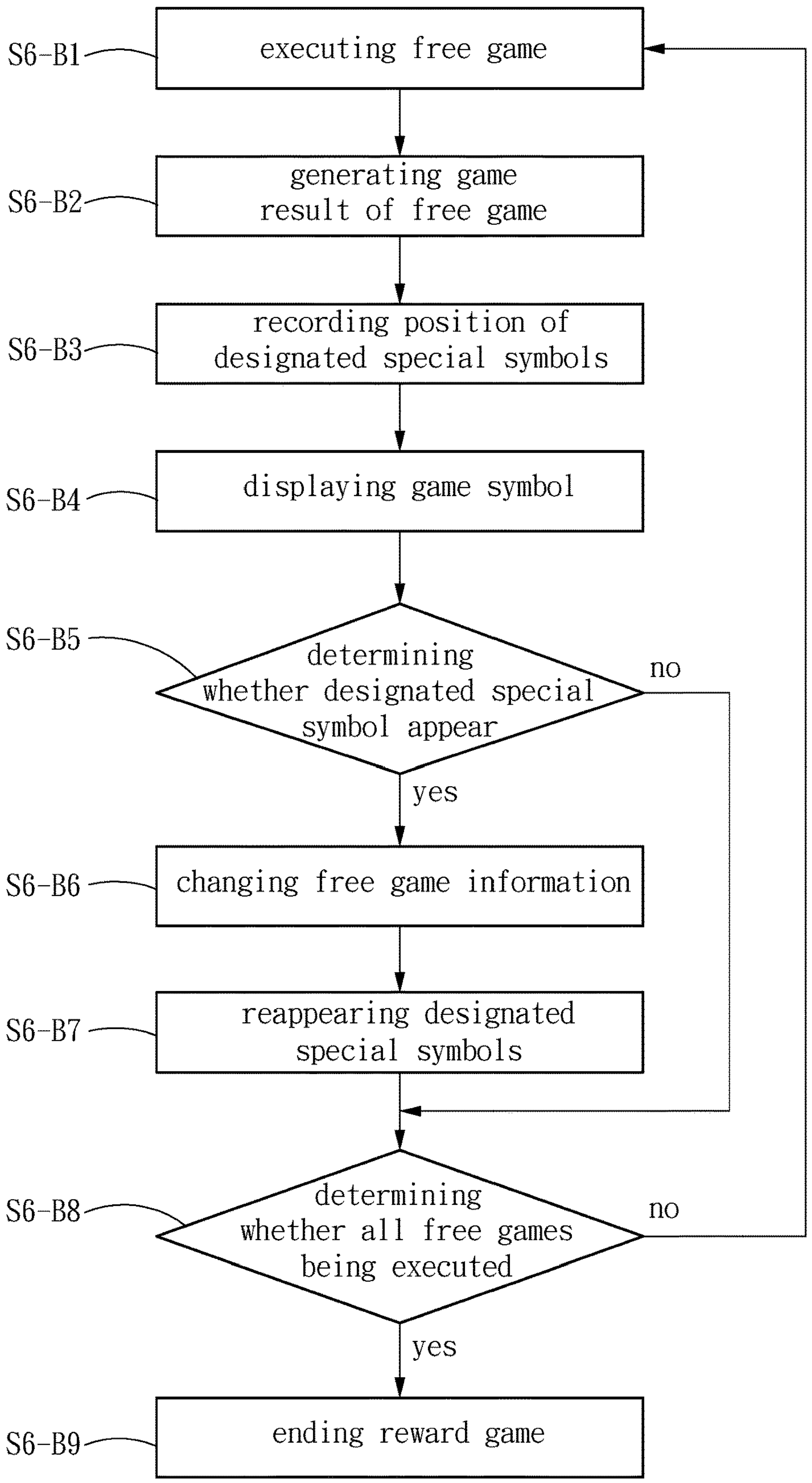
FIG. 7 is an operation flow chart of the reward game of another embodiment of the present invention.

Please refer to FIG. 7, which is a flowchart of steps in another embodiment. After starting the reward game in step S6-B1 which is the same as step S6-A1 of FIG. 5, the control unit 15 executes the first round of free games and controlling the game result generating unit 12 to generate the corresponding game result, that being, performing step S6-B2, and generates the game screen corresponding to the game result. Then, the display unit 13 displays the game screen. Quantity and arrangement of the rollers, types of the game symbols in the game screen of this embodiment, and method of generating the game screen according to the game result can be referred to the related description of the embodiment of FIG. 5. Presentation and visual effects of the game screen will be listed and explained below.

Figure 8A:
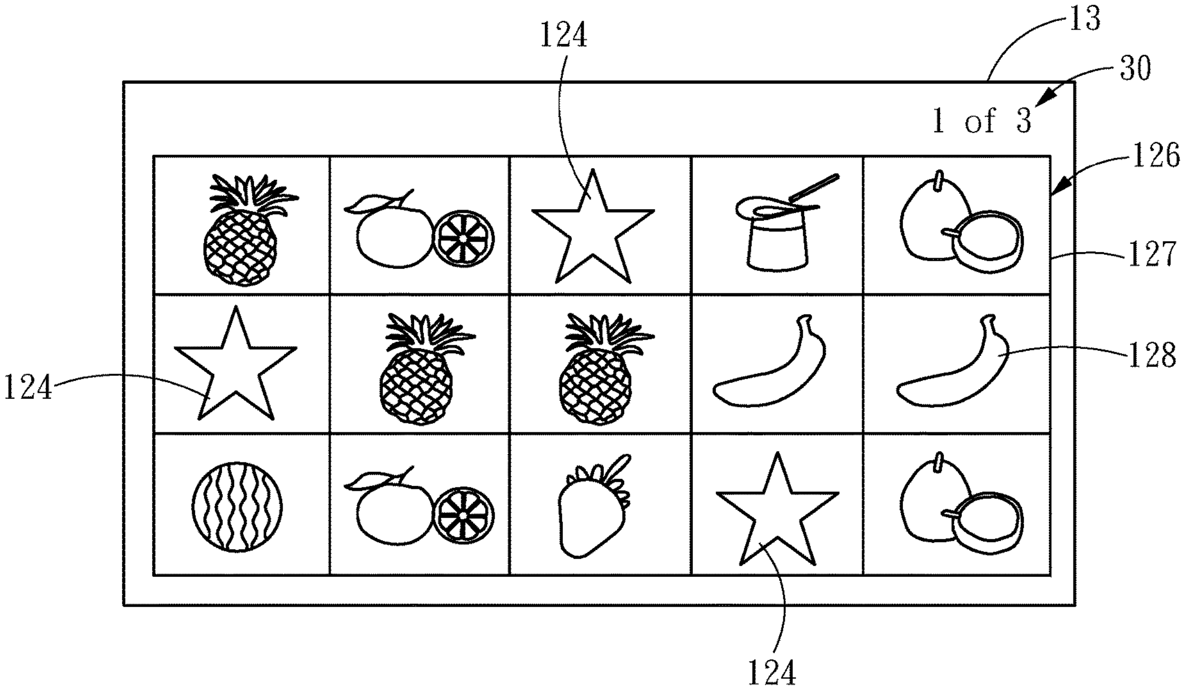
FIGS. 8A-8D are schematic diagrams of the second game screen of another embodiment of the present invention.

In the process of performing the free games, the control unit 15 records relevant information (such as position information, quantity information, etc.) of the designated special symbols 124 displaying on the rollers in the previously mentioned initial screen or in the game screen 121 that meeting the start-up event, that being, performing step S6-B3. For example, the control unit 15 records positions where the three designated special symbols 124 appear in the initial screen of FIG. 8A. However, in other embodiments, step S6-B3 can also be performed at any time point between the start-up event occurring and the first round of free games beginning.

Figure 8B:
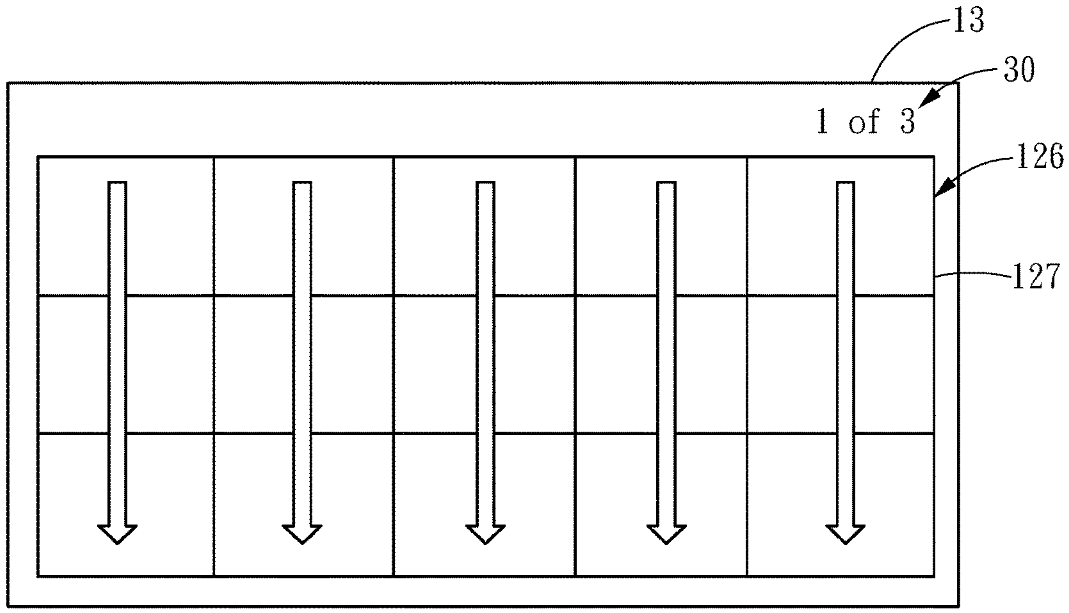
Figure 8C:
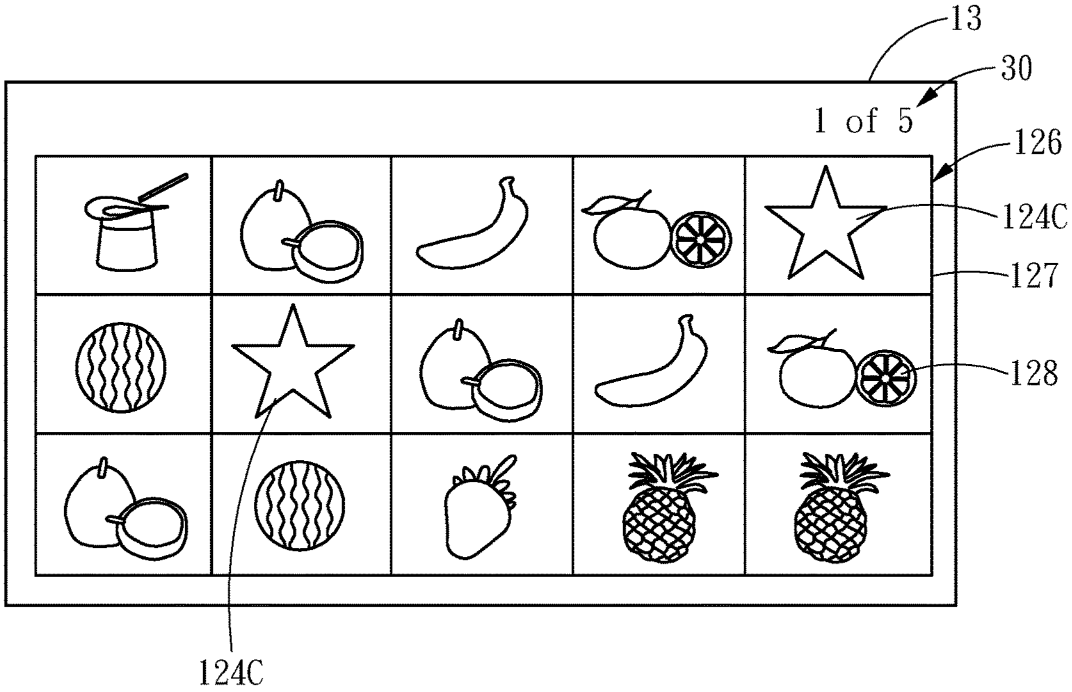

Then, as shown in FIG. 8B, all the rollers 127 will roll (indicated by arrows). While the rollers 127 are rolling, the designated special symbols 124 that appeared previously do not stay at their original positions. After stopping, as shown in FIG. 8C, each of the pattern display positions on each of the rollers 127 newly displays at least one of the game symbols 128 according to the game result generated by the game result generating unit 12, that being, completing step S6-B4.

At this time, in step S6-B5, according to the game result of the round the control unit 15 determines whether a designated special symbols 124C additionally appearing in the game screen 126 of the round, that being, determining whether the rollers 127 rolling out at least one of the designated special symbols 124C; if not, performing step S6-B8; if yes, the control unit 15 performing step S6-B6: changing the free game information 30. For the method of changing the free game information 30, please refer to the relevant description of the embodiment of FIG. 5. In this embodiment or other embodiments, step S6-B6 can also be performed at any time point between steps S6-B5 and S6-B8.

Figure 8D:
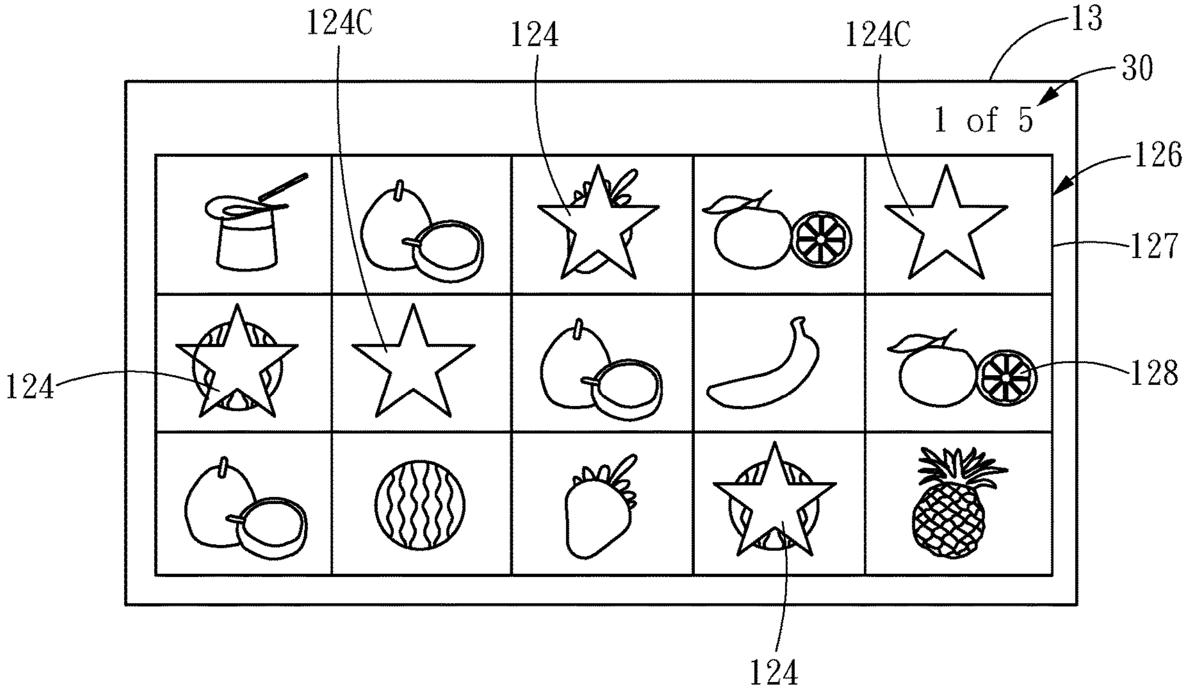

Then, the game result generating unit 12 causes the designated special symbols 124 previously reappearing on the rollers 127 is on the basis of at least part of the previously recorded relevant information of the designated special symbols 124, that being, performing step S6-B7. For example, as shown in FIG. 8D, the designated special symbols 124 reappeared at the original positions overlap the game symbols 128 newly appeared of the round. Alternatively, for example, the designated special symbols 124 reappeared at random or designated positions in all the pattern display positions overlap the game symbols 128 newly appeared of the round. A variety of subsequent processing methods for whether the designated special symbols 124 reappeared and the game symbols 128 newly appeared are kept or replaced can be implemented on the basis of determining result of whether the game symbols 128 newly appeared are the designated special symbols 124C, and referring to the relevant description of the embodiment of FIG. 5, which will not be repeated here. The control unit 15 can update the previously recorded related information according to the situation in which the designated special symbols 124 and 124C in the game screen 126 are displayed on the rollers 127 for use in execution of the subsequent free games.

Then, the control unit 15 determines whether the free games having been finished, that being, performing step S6-B8. If there are still free games that have not yet been executed, continuing to perform the next round (second, third . . . round) of free games, that being, returning to step S6-B1, performing steps S6-B2 to S6-B8 sequentially. Repeat the above steps S6-B1 to S6-B8 in this way until the free game information 30 indicates "N of N", that is, when the $N^{th}$ free game is in progress and a total quantity of the free games is N, step S6-B8 determines the free games having been finished, and continues to perform step S6-B9: ending the reward game, that being, ending step S6 which performing the reward game.

When all the free games have been executed, it means that the reward game has been executed. At this time, the control unit 15 gives the player a score at least according to the designated special symbols 124 and 124C displayed. Specifically, the control unit 15 determines a payout result to pay the player at least based on the betting signal and the game results. In the example where the designated special symbols 124 and 124C have a corresponding score multiplier or score, the control unit 15 calculates a score to be paid to the player as the payout result according to a bet amount indicated by the betting signal, a quantity of the designated special symbols 124 and 124C collected, and the score multipliers or scores corresponding to the designated special symbols 124 and 124C. In the example where the designated special symbols 124 and 124C include the common part and the variable part, and the variable part indicates a numerical value, the control unit 15 calculates a score to be paid to the player as the payout result according to numerical values corresponding to at least part of the designated special symbols 124 and 124C (for example, numerical values corresponding to at least part of the designated special symbols 124 and 124C are added together) collected.

Therefore, the more free games the player plays, the higher amount of payout result the player can have a chance to obtain.

Figure 9A:
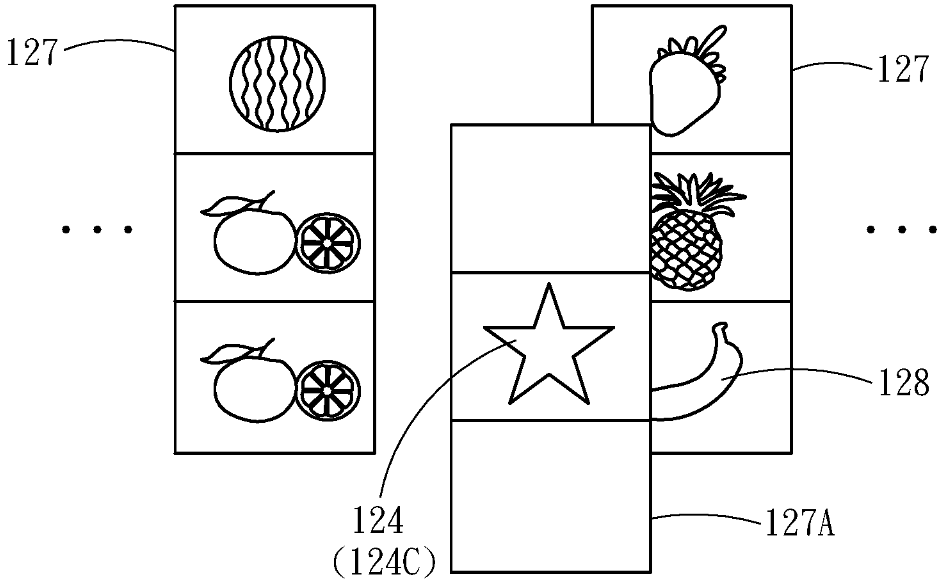
FIGS. 9A-9B are schematic diagrams of a first special symbol of the present invention shown on a secondary roller.
Figure 9B:
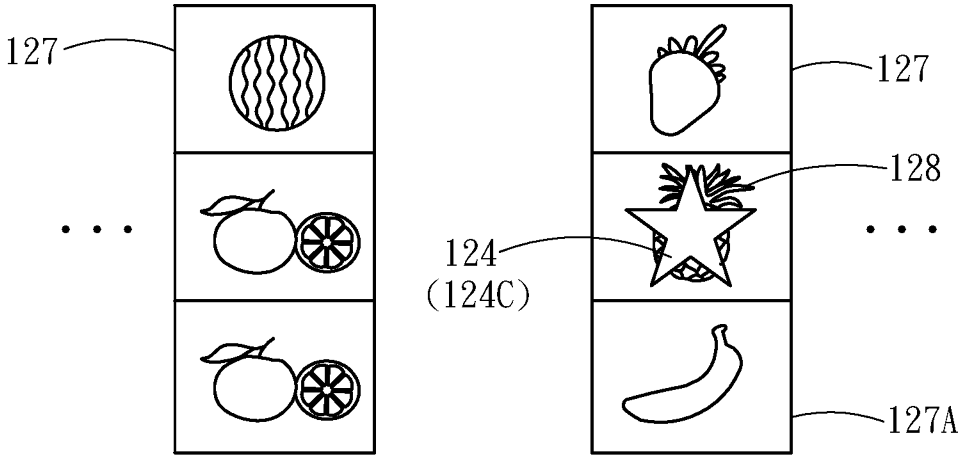

In order to clearly display the game symbols 128 overlapping the designated special symbols 124 or 124C, a multiple rollers can be used. Please refer to FIG. 9A and FIG. 9B, in one embodiment, the rollers 127 can include a secondary roller 127A. The secondary roller 127A overlaps one of the rollers 127 (main roller), so that the game symbols 128 overlapped can be located on either one of the roller 127 (main roller) or the secondary roller 127A, and the designated special symbols 124 or 124C can be located on one of the roller 127 (main roller) and the secondary roller 127A. In this embodiment or other embodiments, in the rolling state, the rollers 127 and the secondary roller 127A are indicated in a separated manner. In other words, at least one of the rollers 127 and the secondary roller 127A will roll visually. When rolling is stopped, as shown in FIG. 9A, the designated special symbols 124 or 124C is located on the secondary roller 127A, and the game symbols 128 is located on the roller 127. Since the rollers 127 and the secondary roller 127A are displayed overlappingly, the game symbols 128 and the designated special symbols 124 or 124C are visually displayed as overlapping. Moreover, in another embodiment, all the rollers 127 have the corresponding secondary roller 127A to display the game symbols 128 or the designated special symbols 124 or 124C correspondingly.

Figure 10:
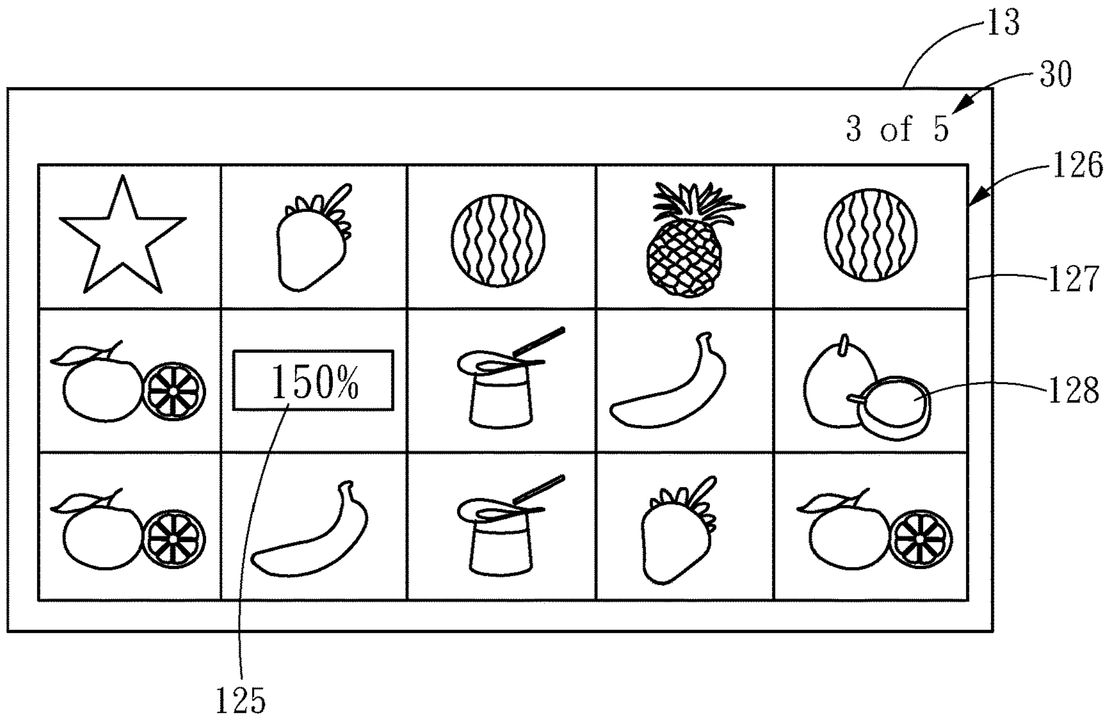
FIG. 10 is a schematic diagram of representation mode of a second special symbol of the present invention.
Figure 11:
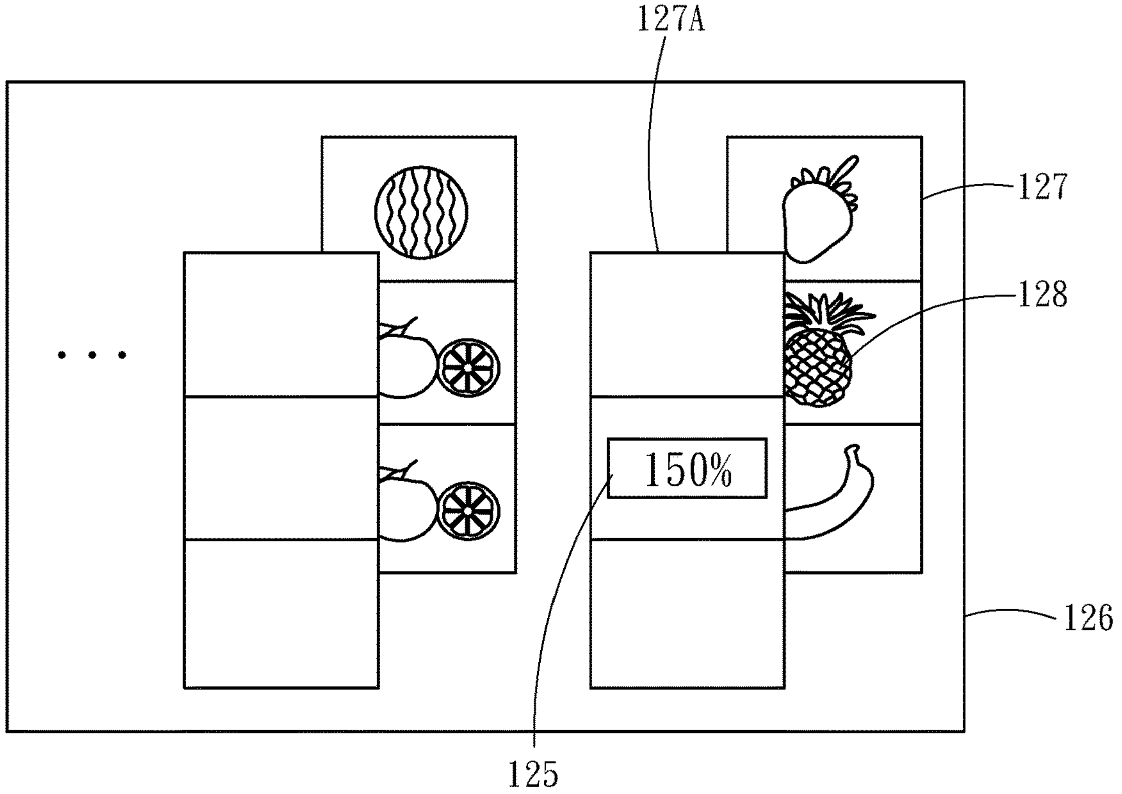
FIG. 11 is a schematic diagram of the second special symbol of the present invention shown on the secondary roller.

Similarly, in one embodiment, other types of the special symbols can also be displayed by the multiple rollers. As shown in FIG. 11, a special symbol 125 indicated as "150%" can appear on either one of the rollers 127 which is the main roller or the secondary roller 127A which overlaps the main roller, and at least one of the game symbols 128 appears on the other one of the rollers 127 which is the main roller and the secondary roller 127A, at least part of the special symbol 125 is capable of overlapping at least one of the game symbols 128 at the moment the rollers 127 stop rolling. Therefore, after the rollers 127 stop rolling, the special symbol 125 can further coexist with at least one of the game symbols 128 overlapped at the same time, or can further completely cover the at least one of the game symbols 128 overlapped, as shown in FIG. 10.

In addition, in one embodiment, the roller game can further include another type of the special symbol. The special symbol includes at least two types of reward symbols, and the at least two types of reward symbols respectively correspond to different reward criteria. Types of the reward symbols include, for example, but not limited to the special symbols mentioned above. Method of displaying the different reward symbols of the special symbol can be, for example, but not limited to, appearing at the same time, or revealing one of the reward symbols by flipping the other one of the reward symbols, or revealing one of the reward symbols by splitting the other one of the reward symbols, or other ways of revealing one of the reward symbols through the other one of the reward symbols. Further, in one embodiment, the special symbol has a chance to appear on at least one of the main roller and the secondary roller.

Figure 12:
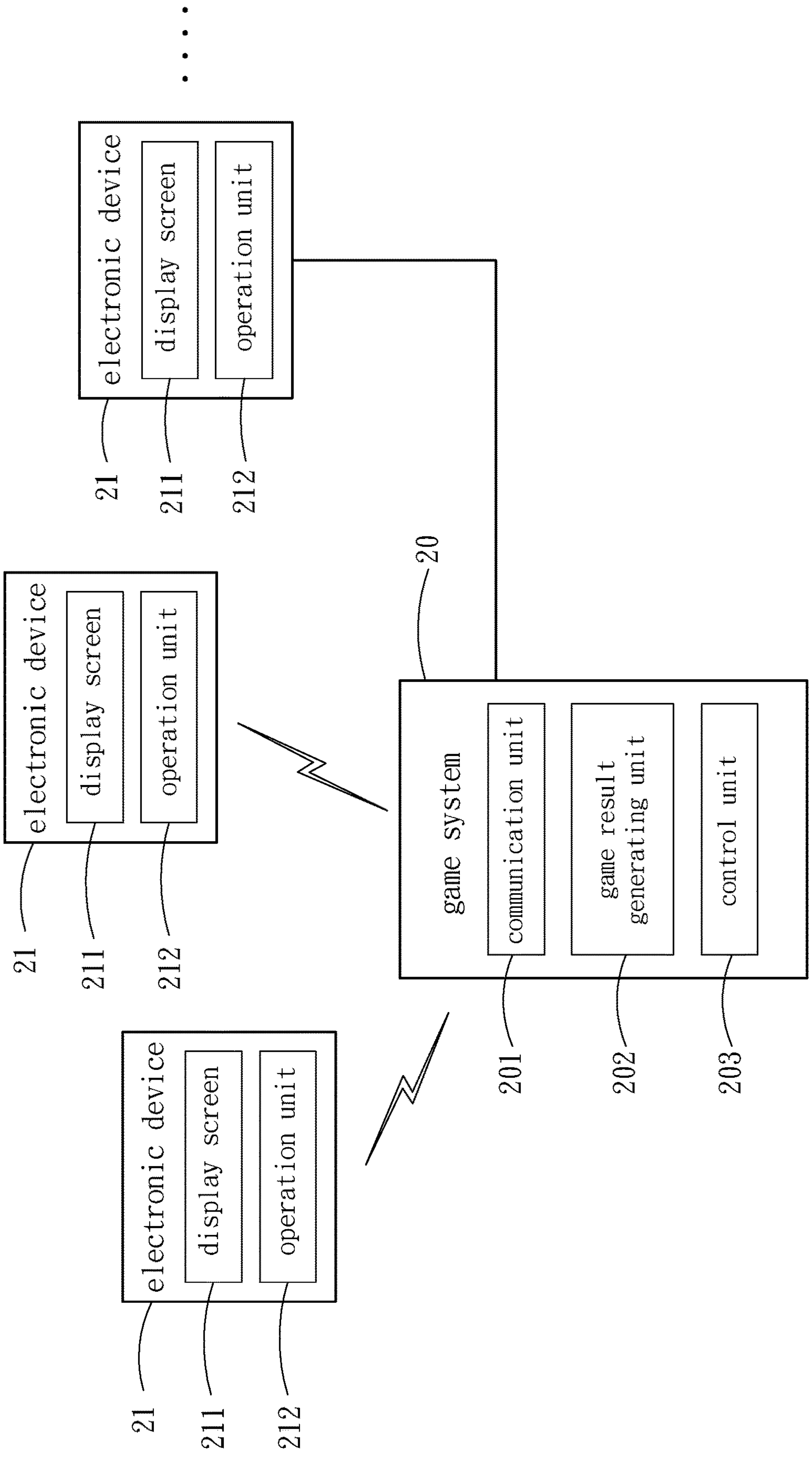
FIG. 12 is a functional block diagram of the game system of another embodiment of the present invention.

In addition, please refer to FIG. 12, a game system 20 according to another embodiment can also be provided. The game system 20 allows an electronic device 21 of the player to be connected for the player to use the electronic device 21 to play the roller game. The electronic device 21 can be any other electronic device that can be used for Internet access, such as computer, tablet computer, mobile phone, and the like. The electronic device 21 includes a display screen 211 and an operation unit 212. One embodiment of the operation unit 212 can be referred to the input interface 11 of the game system 10 aforementioned. The game system 20 includes a communication unit 201, a game result generating unit 202, and a control unit 203. Operation modes of the game result generating unit 202 and the control unit 203 can be referred to the description of the foregoing embodiments. The communication unit 201 is used for signal connection between the game system 20 and the electronic device 21 to transmit communication data to each other. Thereby, the game screen provided by the game system 20 can be displayed to the player of the electronic device 21 via the display screen 211 of the electronic device 21, and the player can also control progress of the roller game via the operation unit 212.

Figure 13:
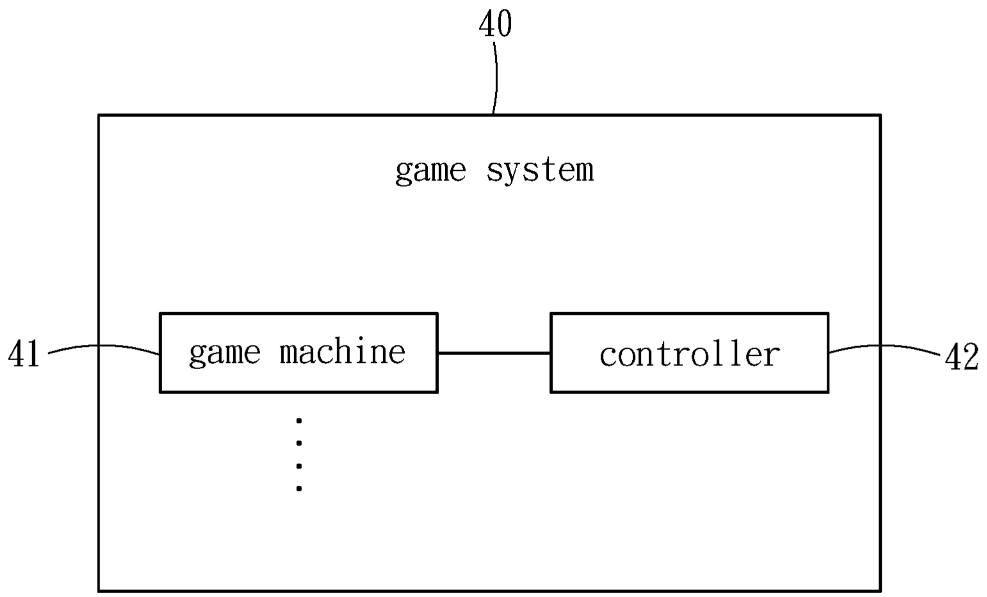
FIG. 13 is a functional block diagram of the game system of another embodiment of the present invention.

In addition, please refer to FIG. 13, which is a game system 40 according to another embodiment, the game system 40 further includes at least one of a plurality of game machines 41 and a controller 42, each of the game machines 41 includes an input interface 11, a game result generating unit 12, a display unit 13 and a control unit 203 respectively, and operation mode of each of the elements can be referred to the description of the aforementioned embodiment of FIG. 1. Each of the game machines 41 are connected to the controller 42 to use the controller 42 to manage information provided by each of the game machines 41, such as member information, information in errors occurring on the game machines 41, information on playing bonus or reward games on the game machines 41, etc. Accordingly, a plurality of players can use the different game machines 41 to play games together, or the game system 40 can provide different services or give rewards to the individual players through the game machines 41.

In summary, the present invention has the following features:

1. Each time when the free game is performed, each of the rollers will roll, so that a probability of obtaining the special symbols in each round of the free games by the player can be kept constant, thereby simplifying the difficulty of calculating the return to player (RTP).
2. After the rollers stop rolling, the previously obtained special symbols are recognized by the player through a manner of keeping or reappearing and through overlapping display or replaced by the advanced special symbols or the upgrade symbols, so that the player can expect to collect a large quantity of the special symbols. Therefore, the amusement of playing the game can be further enhanced.

3. With the design of the main roller and the secondary roller to display the first game symbol and the second game symbol which are the special symbols at the same time, the game's variability and visual effects can be further improved.

What is claimed is:

1. A game system, including:
a game result generating unit;
a display unit; and
a control unit, the control unit being connected to the game result generating unit and the display unit, the control unit executing a plurality of commands of a roller game to control the game system to perform the following steps of:
generating a first game result and generating a first game screen by corresponding to the first game result through the game result generating unit, the first game screen including a plurality of first rollers which are arranged adjacent to each other and a plurality of first game symbols, displaying the plurality of first game symbols on the plurality of first rollers respectively by a manner of rolling and stopping the plurality of first rollers, wherein the plurality of first game symbols are displayed without overlapping one another;
displaying the first game screen through the display unit;
starting a reward game when the control unit determines that a start-up event associated with the plurality of first game symbols appearing on the first game screen occurring, providing at least two consecutive free games by the reward game;
in each of the free games, the control unit controlling the game system to perform the following steps of:
generating a second game result and generating a second game screen by corresponding to the second game result through the game result generating unit, the second game screen including a plurality of second rollers which are arranged adjacent to each other and a plurality of second game symbols, displaying the plurality of second game symbols on the plurality of second rollers respectively by a manner of rolling and stopping the plurality of second rollers;
determining whether at least one first special symbol appears in the plurality of second game symbols of the free game currently performed, and when the plurality of second rollers of the free game performed next stop rolling, displaying the at least one first special symbol at a position on the second game screen of the free game performed next, and overlapping the at least one first special symbol and one of the plurality of second game symbols located at the position of the free game performed next; and
displaying the second game screen through the display unit; and
determining a payout result to pay a player by the control unit at least based on the first game result and each of the second game result.

2. The game system as claimed in claim 1, wherein when the plurality of second rollers of the free game performed next roll, the first special symbol of the free game currently performed appears at the position; and
when the plurality of second rollers of the free game performed next stop rolling, the first special symbol appearing at the position overlaps the second game symbol located at the position.

3. The game system as claimed in claim 1, wherein when the plurality of second rollers of the free game performed next roll, the first special symbol of the free game currently performed does not appear at the position; and
when the plurality of second rollers of the free game performed next stop rolling, the first special symbol of the free game currently performed reappears at the position and overlaps the second game symbol located at the position.

4. The game system as claimed in claim 1, wherein on the second game screen, when the second game symbol overlapping the first special symbol is not the first special symbol, the game result generating unit makes the first special symbol to replace the second game symbol.

5. The game system as claimed in claim 1, wherein on the second game screen, when the second game symbol overlapping the first special symbol is the first special symbol, the game result generating unit replaces the two overlapping first special symbols with an advanced special symbol.

6. The game system as claimed in claim 1, wherein the start-up event is that a quantity of the first special symbol appearing in the first game screen meets a threshold value, and a quantity of the free games provided by the reward game is associated with a quantity of the first special symbol appearing in the plurality of first game symbols.

7. The game system as claimed in claim 1, wherein the start-up event is the plurality of first special symbol appears in the first game symbols in the first game screen, and a quantity of the first special symbol appearing is greater than or equal to a threshold value.

8. The game system as claimed in claim 1, wherein compared to a quantity of the first special symbol appearing in the free game currently performed, each time the first special symbol appears in the free game performed next, the reward game additionally provides at least one free game.

9. The game system as claimed in claim 1, wherein the plurality of second rollers include a secondary roller, the secondary roller overlaps the second roller where the first special symbol overlapping the second game symbol located, the first special symbol is located on one of the second roller overlapped and the secondary roller overlapped, and the second game symbol overlapped is located on the other one of the second roller overlapped and the secondary roller.

10. The game system as claimed in claim 1, wherein the roller game further includes a second special symbol, the control unit further performs:
determining whether the second special symbol appearing on the plurality of first rollers or the plurality of second rollers; and
adjusting the payout result according to the second special symbol appearing on the plurality of first rollers or the plurality of second rollers.

11. The game system as claimed in claim 1, wherein the roller game further includes a second special symbol, the first game screen or the second game screen further includes at least one secondary roller, the control unit further performs:
determining whether the second special symbol appearing on the at least one secondary roller; and
adjusting the payout result according to the second special symbol appearing on the at least one secondary roller.

12. The game system as claimed in claim 10, wherein the second special symbol includes at least two types of reward symbols, and the at least two types of reward symbols respectively correspond to different reward criteria.

13. The game system as claimed in claim 1, wherein the first special symbol includes at least two types of reward symbols, and the at least two types of reward symbols respectively correspond to different reward criteria.

14. The game system as claimed in claim 1, further including:

a game machine, the game machine including the game result generating unit, the display unit and the control unit; and a controller, the controller being connected to the game machine to manage information provided by the game machine.

15. A game system including:

a game result generating unit; and a control unit, the control unit being connected to the game result generating unit, the control unit further communicating with an electronic device of a player, wherein the electronic device includes a display screen, the control unit executes a plurality of commands of a roller game to control the game system to perform the following steps of:

generating a first game result and generating a first game screen by corresponding to the first game result through the game result generating unit, the first game screen including a plurality of first rollers which are arranged adjacent to each other and a plurality of first game symbols, displaying the plurality of first game symbols on the plurality of first rollers respectively by a manner of rolling and stopping the plurality of first rollers, wherein the plurality of first game symbols are displayed without overlapping one another;

transmitting the first game screen to the display screen and displaying the first game screen through the display screen;

starting a reward game when the control unit determines a start-up event associated with the plurality of first game symbols appearing on the first game screen occurring, providing at least two consecutive free games by the reward game;

in each of the free games, the control unit controlling the game system to perform the following steps of:

generating a second game result and generating a second game screen by corresponding to the second game result through the game result generating unit, the second game screen including a plurality of second rollers which are arranged adjacent to each other and a plurality of second game symbols, displaying the plurality of second game symbols on the plurality of second rollers respectively by a manner of rolling and stopping the plurality of second rollers;

determining whether at least one first special symbol appears in the plurality of second game symbols of the free game currently performed, and when the plurality of second rollers of the free game performed next stop rolling, displaying the at least one first special symbol at a position on the second game screen of the free game performed next, and overlapping the at least one first special symbol and one of the plurality of second game symbols located at the position of the free game performed next; and transmitting the second game screen to the display screen and displaying the second game screen through the display screen; and determining a payout result to pay the player by the control unit at least based on the first game result and each of the second game results.

16. An operation method of a game system, the game system being provided for a player to play a roller game, the game system including a game result generating unit, a display unit, and a control unit, the operation method including:

generating a first game result and generating a first game screen by corresponding to the first game result through the game result generating unit, the first game screen including a plurality of first rollers which are arranged adjacent to each other and a plurality of first game symbols, displaying the plurality of first game symbols on the plurality of first rollers respectively by a manner of rolling and stopping the plurality of first rollers, wherein the plurality of first game symbols are displayed without overlapping one another;

displaying the first game screen through the display unit;

starting a reward game when the control unit determines that a start-up event associated with the plurality of first game symbols appearing on the first game screen occurring, and the reward game providing at least two free games continuously;

in each of the free games, the control unit controlling the game system to perform the following steps of:

generating a second game result and generating a second game screen by corresponding to the second game result through the game result generating unit, the second game screen including a plurality of second rollers which are arranged adjacent to each other and a plurality of second game symbols, displaying the plurality of second game symbols on the plurality of second rollers respectively by a manner of rolling and stopping the plurality of second rollers;

determining whether at least one first special symbol appears in the plurality of second game symbols of the free game currently performed, and when the plurality of second rollers of the free game performed next stop rolling, displaying the at least one first special symbol at a position on the second game screen of the free game performed next, and overlapping the at least one first special symbol and one of the plurality of second game symbols located at the position of the free game performed next; and displaying the second game screen through the display unit; and determining a payout result to pay the player by the control unit at least based on the first game result and each of the second game results.

17. A game system including:

a game result generating unit;

a display unit; and a control unit, the control unit being connected to the game result generating unit and the display unit, the control unit executing a plurality of commands of a roller game to control the game system to perform the following steps of:

generating a first game result and generating a first game screen by corresponding to the first game result through the game result generating unit, the first game screen including a plurality of main rollers which are arranged adjacent to each other and a plurality of first game symbols, displaying the plurality of first game symbols on the plurality of main rollers respectively, wherein the plurality of first game symbols are displayed without overlapping one another;

displaying the first game screen through the display unit;

generating a second game result and generating a second game screen by corresponding to the second game result through the game result generating unit, the second game screen including the plurality of main rollers and a plurality of second game symbols, displaying the second game symbols on the plurality of main rollers respectively, wherein when at least one of the plurality of first game symbols in the first game screen is a special symbol, the second game screen further includes at least one secondary roller, the at least one secondary roller overlaps the main roller where the special symbol is located, so that when the plurality of main rollers and the at least one secondary roller of the second game screen stop rolling, the special symbol at a position overlaps the second game symbol at the position, the special symbol is located on one of the main roller overlapped and the secondary roller, and the second game symbol overlapping the special symbol is located on the other one of the main roller overlapped and the secondary roller;

displaying the second game screen through the display unit; and determining a payout result to pay a player by the control unit at least based on at least one of the first game result and the second game result.

18. A game system including:

a display unit; and a control unit, the control unit being connected to the display unit, the control unit executing a plurality of commands of a roller game to control the game system to perform the following steps:

the control unit generating a game screen, the game screen including a plurality of rollers adjacently arranged, the plurality of rollers displaying a first set of game symbols on the plurality of rollers by a manner of rolling and stopping, and the first set of game symbols including a plurality of special symbols, wherein the first set of game symbols are displayed without overlapping one another;

the display unit displaying the game screen;

the control unit generating an another game screen, the another game screen including the plurality of rollers, the plurality of rollers displaying a second set of game symbols and the plurality of special symbols of the first set of game symbols on the plurality of rollers by a manner of rolling and stopping, and at least part of the second set of game symbols overlapping the plurality of special symbols when the plurality of rollers stopping rolling;

the display unit displaying the another game screen; and the control unit determining a payout result to pay a player at least based on the plurality of special symbols.

* * * * *